(12) United States Patent
Chen

(10) Patent No.: US 12,041,262 B2
(45) Date of Patent: Jul. 16, 2024

(54) ENCODING AND DECODING METHOD, APPARATUS, AND DEVICE

(71) Applicant: HANGZHOU HIKVISION DIGITAL TECHNOLOGY CO., LTD., Hangzhou (CN)

(72) Inventor: Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 287 days.

(21) Appl. No.: 17/595,777

(22) PCT Filed: Jun. 17, 2020

(86) PCT No.: PCT/CN2020/096600
§ 371 (c)(1),
(2) Date: Nov. 24, 2021

(87) PCT Pub. No.: WO2020/253730
PCT Pub. Date: Dec. 24, 2020

(65) Prior Publication Data
US 2022/0232242 A1    Jul. 21, 2022

(30) Foreign Application Priority Data
Jun. 21, 2019    (CN) .......................... 201910544562.5

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/159* (2014.11); *H04N 19/176* (2014.11)

(58) Field of Classification Search
CPC .. H04N 19/513; H04N 19/105; H04N 19/159; H04N 19/176
See application file for complete search history.

(56) References Cited

U.S. PATENT DOCUMENTS 8,045,616 B2    10/2011    Sekiguchi et al.
9,078,007 B2    7/2015    Karczewicz et al.
(Continued)

FOREIGN PATENT DOCUMENTS

| CN | 101064845 | 10/2007 |
|---|---|---|
| CN | 102934444 | 2/2013 |

(Continued)

OTHER PUBLICATIONS

Chen, Qing-ye translation of CN 107925775 A Aug. 2016 (Year: 2016).*

(Continued)

*Primary Examiner* — Zaihan Jiang
(74) *Attorney, Agent, or Firm* — NORTON ROSE FULBRIGHT US LLP

(57) ABSTRACT

An encoding and decoding method, apparatus, and device is disclosed. The method comprises: if characteristic information of a current block meets a specific condition, performing the following steps to acquire a target prediction value of the current block or a sub-block of the current block: determining a first original prediction value based on first unidirectional motion information of the current block, and determining a second original prediction value based on second unidirectional motion information of the current block; determining a horizontal velocity based on the first original prediction value and the second original prediction value; determining a vertical velocity based on the first original prediction value and the second original prediction value; acquiring a prediction compensation value based on the horizontal velocity and the vertical velocity; and acquir- (Continued)

ing the target prediction value based on the first original prediction value, the second original prediction value and the prediction compensation value.

20 Claims, 4 Drawing Sheets

(51) Int. Cl.
    *H04N 19/159*     (2014.01)
    *H04N 19/176*     (2014.01)

(56) References Cited

U.S. PATENT DOCUMENTS

| | | | |
|---|---|---|---|
| 9,584,823 | B2 | 2/2017 | Chen et al. |
| 11,140,409 | B2 * | 10/2021 | Park ................... H04N 19/176 |
| 2006/0209961 | A1 | 9/2006 | Han et al. |
| 2008/0260025 | A1 | 10/2008 | Wada |
| 2013/0243093 | A1 | 9/2013 | Chen et al. |
| 2015/0208090 | A1 | 7/2015 | Sakakibara et al. |
| 2017/0094305 | A1 | 3/2017 | Li et al. |
| 2018/0081171 | A1 | 3/2018 | Park et al. |
| 2018/0192072 | A1 | 7/2018 | Chen et al. |
| 2018/0249172 | A1 * | 8/2018 | Chen ................... H04N 19/521 |
| 2018/0262773 | A1 | 9/2018 | Chuang et al. |
| 2018/0278949 | A1 | 9/2018 | Karczewiez et al. |
| 2018/0376166 | A1 | 12/2018 | Chuang et al. |
| 2019/0045215 | A1 | 2/2019 | Chen et al. |
| 2019/0075293 | A1 | 3/2019 | Lim et al. |
| 2020/0260070 | A1 * | 8/2020 | Yoo ........................ H04N 19/61 |
| 2020/0296416 | A1 * | 9/2020 | Liao ..................... H04N 19/139 |
| 2020/0382795 | A1 * | 12/2020 | Zhang .................. H04N 19/137 |
| 2021/0084309 | A1 * | 3/2021 | Zhao .................... H04N 19/186 |
| 2021/0092404 | A1 * | 3/2021 | Huang .................. H04N 19/513 |
| 2021/0314623 | A1 * | 10/2021 | Chang ................... H04N 19/136 |
| 2021/0368180 | A1 * | 11/2021 | Park ..................... H04N 19/176 |
| 2021/0368208 | A1 * | 11/2021 | Samuelsson ........... H04N 19/70 |
| 2021/0392367 | A1 * | 12/2021 | Zhang .................. H04N 19/577 |
| 2022/0030266 | A1 * | 1/2022 | Park ..................... H04N 19/159 |
| 2022/0070487 | A1 * | 3/2022 | Park ....................... H04N 19/52 |

FOREIGN PATENT DOCUMENTS

| | | | | |
|---|---|---|---|---|
| CN | 104427345 | | 3/2015 | |
| CN | 106454378 | | 2/2017 | |
| CN | 107925775 | | 4/2018 | |
| CN | 107925775 | A * | 4/2018 | ............. G06T 7/269 |
| CN | 108028929 | | 5/2018 | |
| CN | 108028929 | A * | 5/2018 | ............ H04N 19/132 |
| CN | 108541375 | | 9/2018 | |
| CN | 108781294 | | 11/2018 | |
| CN | 108781295 | | 11/2018 | |
| CN | 109479141 | | 3/2019 | |
| CN | 109792534 | | 5/2019 | |
| CN | 109804627 | | 5/2019 | |
| CN | 109819255 | | 5/2019 | |
| CN | 109862369 | | 6/2019 | |
| CN | 111031318 | | 4/2020 | |
| EP | 3398331 | | 11/2018 | |
| JP | 2008048235 | | 2/2008 | |
| JP | 6273828 | | 2/2018 | |
| KR | 20150120667 | | 10/2015 | |
| KR | 20180119084 | | 11/2018 | |
| KR | 20190046704 | | 5/2019 | |
| RU | 2620723 | | 5/2017 | |
| RU | 2624560 | | 7/2017 | |
| WO | WO 2016/187776 | | 12/2016 | |
| WO | WO 2017/058899 | | 4/2017 | |
| WO | WO 2017/133661 | | 8/2017 | |
| WO | WO 2018/113658 | | 6/2018 | |
| WO | WO 2018129172 | | 7/2018 | |
| WO | WO-2018129172 | A1 * | 7/2018 | ........... H04N 19/119 |
| WO | WO 2018/174618 | | 9/2018 | |
| WO | WO 2018/199468 | | 11/2018 | |
| WO | WO 2018/212578 | | 11/2018 | |
| WO | WO 2019010156 | | 1/2019 | |
| WO | WO 2019/045427 | | 3/2019 | |
| WO | WO 2019/074273 | | 4/2019 | |
| WO | WO 2019/117640 | | 6/2019 | |

OTHER PUBLICATIONS

Li, Xiang translation of CN 108028929 A Sep. 2016 (Year: 2016).*
Chen et al., "Non-CE9: Modified enabling condition for DMVR and BDOF" Mar. 19-27, 2019, 14th Meeting: Geneva, CH, Joint Video Experts Team (JVET), doc. JVET-N0162-v2, Mar. 19, 2019.
Office Action issued in Corresponding Japanese Application No. 2021-570237, dated Jan. 17, 2023 (English Translation provided).
Xiu et al., "Description of SDR, HDR, and 360° video coding technology proposal by InterDigital Communications and Dolby Laboratories" Apr. 10-20, 2018, 10th Meeting: San Diego, US, Joint Video Experts Team (JVET), doc. JVET-J0015-v1, Apr. 3, 2018.
Bross et al., "Versatile Video Coding (Draft 4)" ISO/IEC VVC, p. 63.
Chen et al., "Algorithm description for Versatile Video Coding and Test Model 5 (VTM 5)." Mar. 19-27, 2019, 14th Meeting: Geneva, CH, Joint Video Experts Team (JVET), doc. JVET-N1002-v2.
Chen et al., "CE4-related: Reduction of interactions between bi-prediction coding tools." Mar. 19-27, 2019, 14th Meeting: Geneva, CH, Joint Video Experts Team (JVET), doc. JVET-N0086-v1, Mar. 12, 2019.
Chen et al., "Non-CE9: Mutually exclusive DMVR/BDOF at CU level." Mar. 19-27, 2019, 14th Meeting: Geneva, CH, Joint Video Experts Team (JVET), doc. JVET-N0328, Aug. 15, 2022.
Chujoh et al., *Non-CE9: On Conditions for DMVR and BDOF*. Sharp Corporation, doc. JVET-N0146, 7 pages.
Lai et al., "CE9-1.2 and CE9-1.4: BDOF early termination" Jul. 3-12, 2019, 15th Meeting: Gothenburg, SE, Joint Video Experts Team (JVET), doc. JVET-O0055-v1, Jun. 17, 2019.
Park et al., "Non-CE9 : BDOF processing considering assumptions of the optical flow." Mar. 19-27, 2019, 14th Meeting: Geneva, CH, Joint Video Experts Team (JVET), doc. JVET-N0443.
Wu et al., "A New Video Compression Encoding Algorithm Combining Frame Rate Conversion With HEVC Standard" Acta Automatica Sinica 2018, 44(9), 1626-1636.
Xiu et al., "CE10-related: Simplification on combined inter and intra prediction (CIIP)." Mar. 19-27, 2019, 14th Meeting: Geneva, CH, Joint Video Experts Team (JVET), doc. JVET-N0327 r1.
Yu, Ruoyang. "Crosscheck of JVET-N0440 (CE9-related: Disabling DMVR and BDOF when underlying assumptions are false)." Mar. 19-27, 2019, 14th Meeting: Geneva, CH, Joint Video Experts Team (JVET), doc. JVET-N0675, Feb. 11, 2022.
Zhao et al., "CE9-2.3: CIIP with disabled BDOF." Jul. 3-12, 2019, 15th Meeting: Gothenburg, SE, Joint Video Experts Team (JVET), doc. JVET-O0103, Sep. 19, 2022.
Notice of Allowance issued in corresponding Russian Application No. 2023110956, dated Oct. 10, 2023.

* cited by examiner

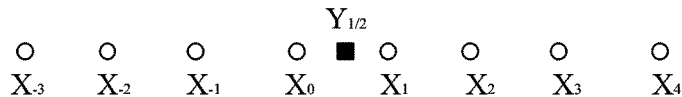

Fig. 1A

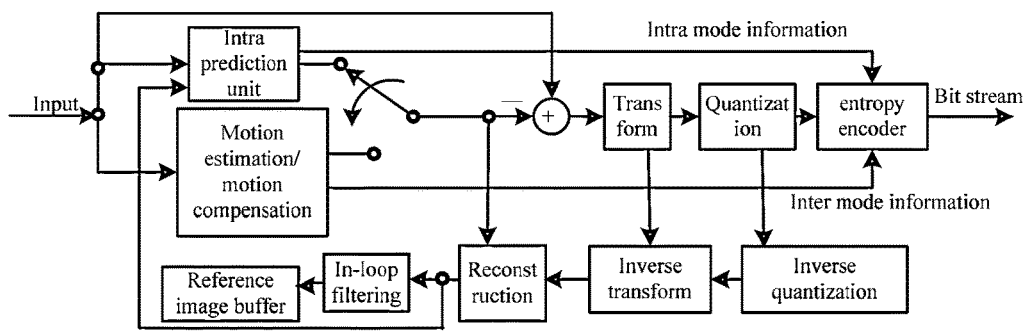

Fig. 1B

| If characteristic information of a current block meets a specific condition, determining a first original prediction value based on first unidirectional motion information of the current block, and determining a second original prediction value based on second unidirectional motion information of the current block | 201 |
|---|---|
| Determining a horizontal velocity based on the first original prediction value and the second original prediction value | 202 |
| Determining a vertical velocity based on the first original prediction value and the second original prediction value | 203 |
| Acquiring a prediction compensation value based on the horizontal velocity and the vertical velocity | 204 |
| Acquiring a target prediction value based on the first original prediction value, the second original prediction value and the prediction compensation value | 205 |

Fig. 2

ENCODING AND DECODING METHOD, APPARATUS, AND DEVICE

CROSS-REFERENCE TO RELATED APPLICATIONS

This application is a national phase application under 35 U.S.C. § 371 of International Application No. PCT/CN2020/096600 filed Jun. 17, 2020, which claims the benefit of priority of Chinese Patent Application No. 201910544562.5 filed Jun. 21, 2019, which are hereby incorporated by reference in their entirety.

TECHNICAL FIELD

The present application relates to the technical field of encoding and decoding, and in particular to an encoding and decoding method, apparatus and device.

BACKGROUND

In order to save space, video images are transmitted after being encoded. A complete video encoding method may include processes such as prediction, transform, quantization, entropy encoding, filtering. Wherein prediction encoding may include intra encoding and inter encoding. Intra encoding uses pixels of adjacent encoded image to predict pixels of the current image by using the time domain correlation of a video, so as to effectively remove a video time domain redundancy.

In the process of inter encoding, a motion vector (MV) can be used to represent a relative displacement between a current block of a video image of a current slice and a reference block of a video image of a reference frame. For example, if there is a strong time domain correlation the video image A of the current slice and the video image B of the reference frame, when the image block A1 (current block) of the video image A needs to be transmitted, a motion search can be performed in the video image B to find an image block B1 (i.e., a reference block) that best matches the image block A1, and to determine a relative displacement between the image block A1 and the image block B1, and the relative displacement is the motion vector of the image block A1.

The encoding side may send the motion vector to the decoding side, instead of sending the image block A1 to the decoding side. The decoding side can obtain the image block A1 based on the motion vector and the image block B1. Of course, the above approach can save a lot of bit overhead since the number of bits occupied by the motion vector is much smaller than the number of bits occupied by the image block A1.

In the traditional method, when the current block is an unidirectional block, after obtaining the motion information of the current block, the encoding and decoding can be performed based on the motion information, thereby improving the encoding performance. However, if the current block is a bidirectional block, after obtaining the bidirectional motion information of the current block, predicted images from two different directions can be obtained based on the bidirectional motion information. Normally, there is a mirror symmetry relationship between the predicted images from two different directions. In the current coding framework, this feature is not fully utilized to further remove redundancy. In other words, for the application scenario of bidirectional blocks, currently there are problems such as poor encoding performance.

SUMMARY

The present application provides an encoding and decoding method, apparatus, and device, which can improve encoding performance.

An embodiment of the present application provides a decoding method, comprising:
when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a CIIP mode is not used for the current block, and an SMVD mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;
wherein, the current block comprises one or more sub-blocks, performing motion compensation based on the bidirectional optical flow mode on the current block comprises:
for each sub-block of the one or more sub-blocks included in the current block, determining a target prediction value of the sub-block; and determining a prediction value of the current block based on target prediction values of all sub-blocks included in the current block;
wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

Optionally, determining a target prediction value of the sub-block comprises:
determining a first original prediction value and a second original prediction value of the sub-block; determining a target prediction value of each 4×4 block in the sub-block based on the first original prediction value and the second original prediction value of the sub-block; determining the target prediction value of the sub-block based on the target prediction value of each 4×4 block in the sub-block.

Optionally, determining the target prediction value of the 4×4 block based on the first original prediction value and the second original prediction value of the sub-block comprises:

for each 4×4 block in the sub-block, determining a horizontal velocity of the 4×4 block based on the first original prediction value and the second original prediction value; determining a vertical velocity of the 4×4 block based on the first original prediction value and the second original prediction value; acquiring a prediction compensation value of the 4×4 block based on the horizontal velocity and the vertical velocity of the 4×4 block; acquiring the target prediction value of the 4×4 block based on the first original prediction value, the second original prediction value and the prediction compensation value of the 4×4 block.

Optionally, motion information of the current block comprises a first motion vector and a first reference frame index, a second motion vector and a second reference frame index; determining the first original prediction value and the second original prediction value of the sub-block comprises: determining the first original prediction value of the sub-block based on the first motion vector and the first reference frame index, determining the second original prediction value of the sub-block based on the second motion vector and the second reference frame index.

Optionally, determining the first original prediction value of the sub-block based on the first motion vector and the first reference frame index, determining the second original prediction value of the sub-block based on the second motion vector and the second reference frame index, comprises: determining a first reference block from a first reference frame corresponding to the first reference frame index based on the first motion vector, and determining the first original prediction value based on a prediction value of the first reference block; determining a second reference block from a second reference frame corresponding to the second reference frame index based on the second motion vector, and determining the second original prediction value based on a prediction value of the second reference block;
wherein, the prediction value of the first reference block comprises a prediction value of a central area of the first reference block and a prediction value of an edge area of the first reference block, the prediction value of the central area of the first reference block is obtained by performing interpolation on a pixel value of a pixel in the first reference frame, and the prediction value of the edge area of the first reference block is obtained by copying a pixel value of a pixel in the first reference frame; the prediction value of the second reference block comprises a prediction value of a central area of the second reference block and a prediction value of an edge area of the second reference block, the prediction value of the central area of the second reference block is obtained by performing interpolation on a pixel value of a pixel in the second reference frame, and the prediction value of the edge area of the second reference block is obtained by copying a pixel value of a pixel in the second reference frame.

Optionally, the edge area of the first reference block is an area with 1 row and 1 column at upper, lower, left, and right portions respectively, except the central area, the prediction value of the edge area of the first reference block is obtained by copying an integer pixel value of a pixel adjacent to the edge area of the first reference block in the first reference frame; the edge area of the second reference block is an area with 1 row and 1 column at upper, lower, left, and right portions respectively, except the central area, the prediction value of the edge area of the second reference block is obtained by copying an integer pixel value of a pixel adjacent to the edge area of the second reference block in the second reference frame.

Optionally, when the current block comprises 1 sub-block, the sub-block is the current block itself; when the current block comprises multiple sub-blocks, motion information of the multiple sub-blocks is the same as that of the current block.

Optionally, determining a horizontal velocity of the 4×4 block based on the first original prediction value and the second original prediction value comprises:
determining a first prediction value and a second prediction value of the 4×4 block based on the first original prediction value and the second original prediction value, determining the horizontal velocity of the 4×4 block based on the first prediction value and the second prediction value of the 4×4 block;
determining a vertical velocity of the 4×4 block based on the first original prediction value and the second original prediction value comprises: determining the vertical velocity of the 4×4 block based on the first prediction value and the second prediction value of the 4×4 block;
acquiring the target prediction value of the 4×4 block based on the first original prediction value, the second original prediction value and the prediction compensation value of the 4×4 block comprises: acquiring the target prediction value of the 4×4 block based on the first prediction value of the 4×4 block, the second prediction value of the 4×4 block, and the prediction compensation value of the 4×4 block.

Optionally, determining a first prediction value and a second prediction value of the 4×4 block based on the first original prediction value and the second original prediction value comprises:
determining a 6×6 block corresponding to the 4×4 block in the first reference block, acquiring a prediction value of the 6×6 block based on the first original prediction value of the first reference block, and determining the prediction value of the 6×6 block as the first prediction value of the 4×4 block;
determining a 6×6 block corresponding to the 4×4 block in the second reference block, acquiring a prediction value of the 6×6 block based on the second original prediction value of the second reference block, and determining the prediction value of the 6×6 block as the second prediction value of the 4×4 block.

Optionally, determining a horizontal velocity and a vertical velocity of the 4×4 block based on the first original prediction value and the second original prediction value comprises:
determining an autocorrelation coefficient S1 of a horizontal gradient sum of the 4×4 block, a cross-correlation coefficient S2 between the horizontal gradient sum and a vertical gradient sum of the 4×4 block, a cross-correlation coefficient S3 between a difference of time domain prediction values and the horizontal gradient sum of the 4×4 block, an autocorrelation coefficient S5 of the vertical gradient sum of the 4×4 block, a cross-correlation coefficient S6 between the difference of time domain prediction values and the vertical gradient sum of the 4×4 block based on the first original prediction value and the second original prediction value;
determining the horizontal velocity and the vertical velocity of the 4×4 block based on the S1, S2, S3, S5, and S6;

wherein, determining the S1, S2, S3, S5, and S6 of the 4×4 block based on the first original prediction value and the second original prediction value comprises:

determining the horizontal gradient sum of the 4×4 block, the vertical gradient sum of the 4×4 block, the difference of time domain prediction values of the 4×4 block based on the first original prediction value and the second original prediction value;

determining the S1, S2, S3, S5, and S6 of the 4×4 block based on the horizontal gradient sum, the vertical gradient sum, the difference of time domain prediction values.

Optionally, determining a horizontal velocity of the 4×4 block based on the first original prediction value and the second original prediction value comprises:

determining an autocorrelation coefficient S1 of a horizontal gradient sum of the 4×4 block, a cross-correlation coefficient S3 between a difference of time domain prediction values and the horizontal gradient sum of the 4×4 block based on the first original prediction value and the second original prediction value; determining the horizontal velocity of the 4×4 block based on the S1, a velocity threshold, the S3; wherein the velocity threshold is M powers of 2, and M is a positive integer;

determining a vertical velocity of the 4×4 block based on the first original prediction value and the second original prediction value comprises:

determining a cross-correlation coefficient S2 between the horizontal gradient sum and a vertical gradient sum of the 4×4 block, an autocorrelation coefficient S5 of the vertical gradient sum of the 4×4 block, a cross-correlation coefficient S6 between the difference of time domain prediction values and the vertical gradient sum of the 4×4 block based on the first original prediction value and the second original prediction value; determining the vertical velocity of the 4×4 block based on the S2, the S5, the S6, a velocity threshold, and the horizontal velocity of the 4×4 block; wherein the velocity threshold is M powers of 2, and M is a positive integer;

wherein, acquiring a prediction compensation value of the 4×4 block based on the horizontal velocity and the vertical velocity of the 4×4 block comprises:

determining a horizontal gradient of the 4×4 block and a vertical gradient of the 4×4 block based on the first original prediction value, the second original prediction value, and the number of right shifts of the gradient; and acquiring the prediction compensation value of the 4×4 block based on the horizontal velocity of the 4×4 block, the vertical velocity of the 4×4 block, the horizontal gradient of the 4×4 block, and the vertical gradient of the 4×4 block.

Optionally, the method further comprising:

for each sub-block of the one or more sub-blocks included in the current block, determining whether a current sub-block meets a specific condition, if the current sub-block meets the specific condition, jumping out of a process of performing prediction compensation on the sub-block based on bidirectional optical flow, wherein, the process of performing prediction compensation on the sub-block based on bidirectional optical flow comprises: for the sub-block, determining the first original prediction value and the second original prediction value of the sub-block; determining a target prediction value of each 4×4 block in the sub-block based on the first original prediction value and the second original prediction value of the sub-block, determining the target prediction value of the sub-block based on the target prediction value of each 4×4 block in the sub-block.

Optionally, determining whether to jump out of the process of performing prediction compensation on the sub-block based on the bidirectional optical flow according to a relationship between a SAD value of the sub-block and a sub-block threshold; wherein, the SAD value of the sub-block is a sum of absolute difference of a vertical two-times down-sampled prediction value of the first prediction block and a vertical two-times down-sampled prediction value of the second prediction block; wherein, the first prediction block is a prediction block corresponding to a sub-block acquired from the first reference frame according to a first motion vector of the current block, and the second prediction block is a prediction block corresponding to a sub-block acquired from the second reference frame according to a second motion vector of the current block.

Optionally, for conditions that bidirectional prediction is used for the current block, two reference frames corresponding to the current block come from different directions, and the two reference frames corresponding to the current block are at a same distance from a current slice, if a display sequence number of the current slice is POC, and the display sequence numbers of the two reference frames corresponding to the current block are POC0 and POC1 respectively, when (POC−POC0)*(POC−POC1)<0, it is considered that the two reference frames come from different directions, and when a value of (POC−POC0) equal to a value of (POC1−POC), it is considered that the distances between the two reference frames and the current slice are the same;

wherein, the weighting weights of the two reference frames corresponding to the current block being the same comprises that it is allowed to use a frame-level weighted prediction method for the current slice and two weighting weights of the current slice are exactly the same; and that it is allowed to use a block-level weighted prediction method Bi-prediction with CU based weighting for the current block and the two weighting weights of the current block are exactly the same;

wherein, the sub-block motion information mode being not used for the current block comprises that an Affine mode is not used for the current block and an subblock-based temporal motion vector prediction mode is not used for the current block; wherein the Affine mode is a mode using an affine motion model, and the subblock-based temporal motion vector prediction mode is a mode for acquiring motion information of an entire block in time domain;

wherein, the width value, the height value, and the area value of the current block being all within a limited range, comprises that the width value of the current block is greater than or equal to 8, the height value of the current block is greater than or equal to 8, and a product of the width value and the height value of the current block is greater than or equal to 128.

An embodiment of the present application provides a decoding apparatus, which is configured to implement the above decoding method.

An embodiment of the present application provides a video decoding device, comprising a processor and a machine-readable storage medium, wherein the machine-readable storage medium stores thereon machine executable instructions that can be executed by the processor;

the processor is configured to execute the machine executable instructions to implement the above decoding method.

An embodiment of the present application provides an electronic device, comprising a processor; and a memory for storing processor executable instructions. Wherein, the processor is configured to implement the above decoding method.

An embodiment of the present application provides a non-transitory storage medium, wherein the non-transitory storage medium stores thereon instructions which, when executed by a processor, cause the processor to implement the above decoding method.

An embodiment of the present application provides a decoding method, comprising:
  when it is determined to use a bidirectional optical flow mode for a current block, performing motion compensation based on the bidirectional optical flow mode on the current block, wherein when the bidirectional optical flow mode is used for the current block, conditions which the current block meets at least comprise: a CIIP mode is forbidden to be used for the current block, and an SMVD mode is forbidden to be used for the current block;
  wherein, the current block comprises one or more sub-blocks, performing motion compensation based on the bidirectional optical flow mode on the current block comprises:
  for each sub-block of the one or more sub-blocks included in the current block, determining a target prediction value of the sub-block; and determining a prediction value of the current block based on target prediction values of all sub-blocks included in the current block;
  wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

An embodiment of the present application provides a decoding method, comprising:
  when it is determined to use a bidirectional optical flow mode for a current block, performing motion compensation based on the bidirectional optical flow mode on the current block, wherein when the bidirectional optical flow mode is used for the current block, conditions which the current block meets at least comprise: a width value of the current block is greater than or equal to 8, a height value of the current block is greater than or equal to 8, and a product of the width value and the height value of the current block is greater than or equal to 128;
  wherein, the current block comprises one or more sub-blocks, performing motion compensation based on the bidirectional optical flow mode on the current block comprises:
  for each sub-block of the one or more sub-blocks included in the current block, determining a target prediction value of the sub-block; and determining a prediction value of the current block based on target prediction values of all sub-blocks included in the current block;
  wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

An embodiment of the present application provides a decoding method, comprising:
  when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: a width value of the current block is greater than or equal to 8, a height value of the current block is greater than or equal to 8, and a product of the width value and the height value of the current block is greater than or equal to 128, a CIIP mode is forbidden to be used for the current block, and an SMVD mode is forbidden to be used for the current block;
  wherein, the current block comprises one or more sub-blocks, performing motion compensation based on the bidirectional optical flow mode on the current block comprises:
  for each sub-block of the one or more sub-blocks included in the current block, determining a target prediction value of the sub-block; and determining a prediction value of the current block based on target prediction values of all sub-blocks included in the current block;
  wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

An embodiment of the present application provides a decoding method, comprising:
  when it is determined to use a bidirectional optical flow mode for a current block, performing motion compensation based on the bidirectional optical flow mode on the current block, wherein when the bidirectional optical flow mode is used for the current block, conditions which the current block meets comprise: bidirectional prediction is used for the current block, and two reference frames corresponding to the current block come from different directions, and the two reference frames corresponding to the current block are at a same distance from a current slice;

wherein, the current block comprises one or more sub-blocks, performing motion compensation based on the bidirectional optical flow mode on the current block comprises:

for each sub-block of the one or more sub-blocks included in the current block, determining a target prediction value of the sub-block; and determining a prediction value of the current block based on target prediction values of all sub-blocks included in the current block;

wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

An embodiment of the present application provides a decoding method, comprising:

when it is determined to use a bidirectional optical flow mode for a current block, performing motion compensation based on the bidirectional optical flow mode on the current block, wherein when the bidirectional optical flow mode is not used for the current block, the current block does not meet at least one of following conditions: switch control information indicates that it is allowed to use the bidirectional optical flow mode for the current block; a sub-block motion information mode is not used for the current block, a CIIP mode is not used for the current block, and an SMVD mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range; wherein the sub-block motion information mode being not used for the current block comprises that an Affine mode is not used for the current block and an subblock-based temporal motion vector prediction mode is not used for the current block;

wherein, the current block comprises one or more sub-blocks, performing motion compensation based on the bidirectional optical flow mode on the current block comprises:

for each sub-block of the one or more sub-blocks included in the current block, determining a target prediction value of the sub-block; and determining a prediction value of the current block based on target prediction values of all sub-blocks included in the current block;

wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

An embodiment of the present application provides a decoding apparatus, configured to implement the above decoding method.

An embodiment of the present application provides a video decoder, comprising a processor and a machine-readable storage medium, wherein the machine-readable storage medium stores thereon machine executable instructions that are able to be executed by the processor. Wherein the processor is configured to execute the machine executable instructions to implement the above decoding method.

An embodiment of the present application provides a video decoding device, comprising a processor and a machine-readable storage medium, wherein the machine-readable storage medium stores thereon machine executable instructions that are able to be executed by the processor, and the processor is configured to execute the machine executable instructions to implement the above decoding method.

An embodiment of the present application provides a non-transitory storage medium, wherein the non-transitory storage medium stores thereon instructions which, when executed by a processor, cause the processor to implement the above decoding method.

The present application provides an encoding and decoding method. The method includes: if characteristic information of a current block meets a specific condition, performing the following steps to acquire a target prediction value of the current block or a sub-block of the current block:

determining a first original prediction value based on first unidirectional motion information of the current block, determining a second original prediction value based on second unidirectional motion information of the current block; and determining a horizontal velocity based on the first original prediction value and the second original prediction value; determining a vertical velocity based on the first original prediction value and the second original prediction value;

acquiring a prediction compensation value based on the horizontal velocity and the vertical velocity;

acquiring the target prediction value based on the first original prediction value, the second original prediction value and the prediction compensation value.

The present application provides an encoding and decoding apparatus configured for acquiring a target prediction value of a current block or a sub-block of the current block if characteristic information of the current block meets a specific condition. The apparatus includes:

a first determination module configured for: if the characteristic information of the current block meets a specific condition, determining a first original prediction value based on first unidirectional motion information of the current block, and determining a second original prediction value based on second unidirectional motion information of the current block;

a second determination module configured for determining a horizontal velocity based on the first original prediction value and the second original prediction value; determining a vertical velocity based on the first original prediction value and the second original prediction value;

a first acquisition module configured for acquiring a prediction compensation value based on the horizontal velocity and the vertical velocity;

a second acquisition module configured for acquiring a target prediction value based on the first original prediction value, the second original prediction value and the prediction compensation value.

The present application provides an encoding device, including a processor and a machine-readable storage medium, wherein the machine-readable storage medium stores machine executable instructions that can be executed by the processor; the processor is configured to execute machine executable instructions to implement the following steps: if characteristic information of a current block meets a specific condition, performing the following steps to acquire a target prediction value of the current block or a sub-block of the current block: determining a first original prediction value based on first unidirectional motion information of the current block, and determining a second original prediction value based on second unidirectional motion information of the current block; determining a horizontal velocity based on the first original prediction value and the second original prediction value; determining a vertical velocity based on the first original prediction value and the second original prediction value; acquiring a prediction compensation value based on the horizontal velocity and the vertical velocity; acquiring a target prediction value based on the first original prediction value, the second original prediction value and the prediction compensation value.

The present application provides a decoding device, including a processor and a machine-readable storage medium, wherein the machine-readable storage medium stores machine executable instructions that can be executed by the processor; the processor is configured to execute machine executable instructions to implement the following steps: if characteristic information of a current block meets a specific condition, performing the following steps to acquire a target prediction value of a current block or a sub-block of the current block: determining a first original prediction value based on first unidirectional motion information of the current block, and determining a second original prediction value based on second unidirectional motion information of the current block; determining a horizontal velocity based on the first original prediction value and the second original prediction value; determining a vertical velocity based on the first original prediction value and the second original prediction value; acquiring a prediction compensation value based on the horizontal velocity and the vertical velocity; acquiring a target prediction value based on the first original prediction value, the second original prediction value and the prediction compensation value.

As can be seen from the above technical solutions, in the embodiments of the present application, the first original prediction value is determined based on the first unidirectional motion information of the current block, the second original prediction value is determined based on the second unidirectional motion information of the current block, the horizontal velocity and the vertical velocity are determined based on the first original prediction value and the second original prediction value, the prediction compensation value is acquired based on the horizontal velocity and the vertical velocity, and the target prediction value is acquired based on the prediction compensation value. By the above method, the target prediction value of the current block or a sub-block of the current block can be acquired based on an optical flow method, thereby improving the friendliness of hardware implementation, and bringing about an improvement in encoding performance.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application. Those skilled in the art can also obtain other drawings based on these drawings without any creative efforts.

FIG. 1A is a schematic diagram of interpolation according to an embodiment of the present application;

FIG. 1B is a schematic diagram of a video encoding framework according to an embodiment of the present application;

FIG. 2 is a flowchart of an encoding and decoding method according to an embodiment of the present application;

DETAILED DESCRIPTION

Figure 3:
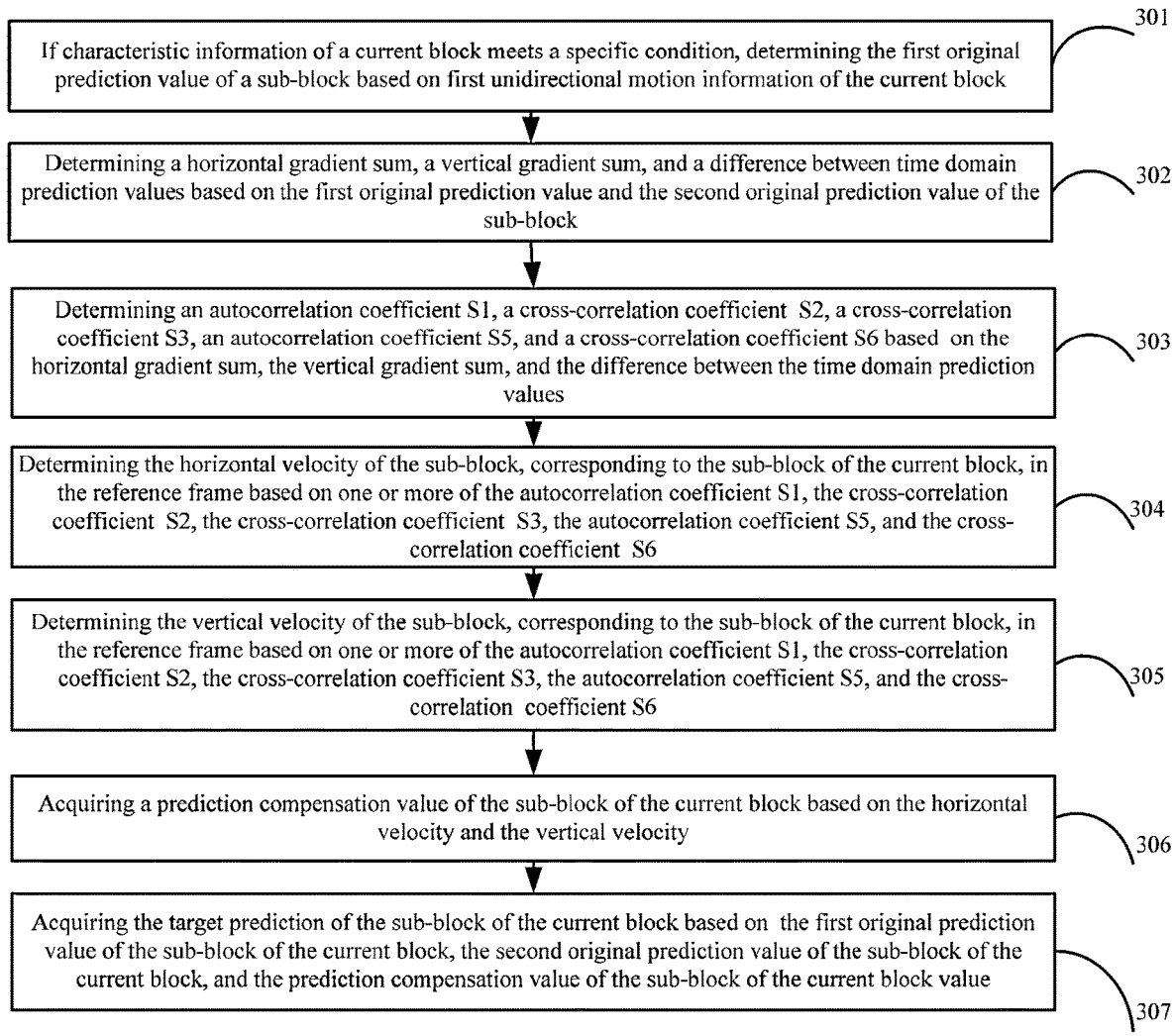
FIG. 3 is a flowchart of an encoding and decoding method according to an embodiment of the present application.

The terms used in the embodiments of the present application are only for the purpose of describing specific embodiments, and are not used to limit the present application. The singular forms of "a/an", "the" and "said" used in the embodiments and claims of the present application are intended to include plural forms, unless the context clearly indicates other meanings. It should also be understood that the term "and/or" as used herein is meant to include any or all possible combinations of one or more associated listed items. It should be understood that although the terms first, second, third, and the like may be used in the embodiments of the present application to describe various information, the information should not be limited to these terms. These terms are only used to distinguish the same type of information from each other. For example, the first information may also be referred to as second information, and similarly, the second information may also be referred to as first information without departing from the scope of this application. In addition, the word "if" used can be interpreted as "in case that . . . ", "when . . . " or "in response to determining . . . " depending on the context.

Embodiments of the present application propose an encoding and decoding method, apparatus, and device, which may involve the following concepts:

Intra prediction and inter prediction technology: intra prediction refers to use pixels of the encoded block of a current image to predict current pixels by using the spatial domain correlation of a video, so as to remove the video time domain redundancy. Inter prediction refers to use pixels of adjacent encoded image to predict pixels of a current image by using the time domain correlation of a video since a video sequence contains a strong time domain correlation, so as to effectively remove the video time domain redundancy. The inter prediction part of a video encoding standard basically adopts block-based motion compensation technology. The principle is to find the optimal matching block in a previously encoded image for each pixel block of the current image. This process is called Motion Estimation (ME).

Motion Vector (MV): in inter encoding, a motion vector can be used to represent the relative displacement between the current encoding block and the optimal matching block in its reference image. Each divided block has a corresponding motion vector that needs to be transmitted to a decoding side. If the motion vector of each block is encoded and transmitted independently, especially when divided into small-sized blocks, a considerable number of bits will be consumed. In order to reduce the number of bits used to encode the motion vector, the spatial correlation between adjacent image blocks can be used to predict the motion vector of the current block to be encoded based on the motion vector of the adjacent encoded block, and then the prediction difference can be encoded. In this way, the number of bits representing the motion vector can be effectively reduced. In the process of encoding the motion vector of the current block, the motion vector of the current block is firstly predicted by using the motion vector of adjacent encoded blocks, and then, the motion vector difference (MVD) between the motion vector prediction (MVP) and the real estimated value of the motion vector is encoded, thereby effectively reducing the number of encoding bits of the MV.

Motion Information: since the motion vector represents the positional offset between a current image block and a reference image block, in order to accurately acquire information related to the image block, in addition to the motion vector, index information of a reference frame image is also needed to indicate which reference frame image is used. In the video encoding technology, a reference frame image list can usually be established for the current slice of image, and the index information of the reference frame image indicates which reference frame image in the reference frame image list is adopted by the current image block. In addition, many encoding technologies also support multiple reference image lists. Therefore, an index value, which may be referred to as a reference direction, may also be used to indicate which reference image list is used. In the video encoding technology, motion-related information such as a motion vector, a reference frame index, a reference direction may be collectively referred to as motion information.

Interpolation: if a current motion vector is a non-integer pixel precision motion vector, the existing pixel value cannot be directly copied from the corresponding reference frame, and the required pixel value is obtained through interpolation. As shown in FIG. 1A, if the pixel value $Y_{1/2}$ with an offset of ½ pixel is desired, it is obtained by interpolating the surrounding existing pixel values X. If an interpolation filter with N taps is adopted, it is obtained by interpolating N surrounding integer pixels. If the number N of taps is 8, then $Y_{1/2} = \Sigma_{k=-3}^{4} a^k X_k$, wherein $a^k$ is the filter coefficient, i.e., the weighting coefficient.

Motion compensation: the process of motion compensation is the process of acquiring all prediction pixel values of the current block through interpolation or copying.

Video encoding framework: referring to FIG. 1B, an encoding-side processing flow based on the embodiment of the present application can be implemented by using the video encoding framework. In addition, the schematic diagram of the video decoding framework is similar to that in FIG. 1B, and will not be repeated herein. Moreover, a decoding-side processing flow based on the embodiment of the present application can be implemented by using a video decoding framework. Specifically, the video encoding framework and the video decoding framework include modules such as intra prediction, motion estimation/motion compensation, reference image buffer, in-loop filtering, reconstruction, transform, quantization, inverse transform, inverse quantization, entropy encoder. At the encoding side, the encoding-side processing flow can be realized through the cooperation between these modules. At the decoding side, the decoding-side processing flow can be realized through the cooperation between these modules.

In the traditional method, when the current block is a bidirectional block (i.e., the current block is a block using bidirectional prediction). Normally, there is a mirror symmetry relationship between the predicted images from two different directions. In the current encoding framework, this feature is not fully utilized to further remove redundancy, resulting in problems such as poor encoding performance. Based on the above findings, when the current block is a bidirectional block, a prediction signal adjustment method based on an optical flow method is proposed in the embodiment of the present application, the original prediction value can be obtained based on the original motion information, and can be used to obtain the prediction compensation value through an optical flow equation. The target prediction value of the current block is obtained based on the prediction compensation value and the original prediction value. By the above method, the target prediction value of the current block can be acquired based on the optical flow method, thereby improving the friendliness of hardware implementation, and bringing about an improvement in coding performance, i.e., the encoding performance and encoding efficiency can be improved.

The encoding and decoding method in the embodiments of the present application will be described in detail below in conjunction with several specific embodiments.

Embodiment 1: FIG. 2 shows a schematic flow chart of an encoding and decoding method, which can be applied to a decoding side or an encoding side. In the method, a current block or a target prediction value of a sub-block of the current block is acquired by performing the following steps. If the following steps are performed for the current block, the target prediction value of the current block can be obtained. If the current block is divided into at least one sub-block, and the following steps are performed for each sub-block of the current block, the target prediction value of the sub-block of the current block can be acquired. The method includes the followings.

At step 201, if characteristic information of the current block meets a specific condition, a first original prediction value is determined based on first unidirectional motion information of the current block, and a second original prediction value is determined based on second unidirectional motion information of the current block.

Exemplarily, the current block may be a bidirectional block, i.e., the current block is a block using bidirectional prediction. In other words, the motion information for the current block is bidirectional motion information, and this bidirectional motion information can include motion information with two different directions. Such motion information with two different directions is called first unidirectional motion information and second unidirectional motion information. The first unidirectional motion information may correspond to a first reference frame, which is located in front of the current slice where the current block is located. The second unidirectional motion information may correspond to a second reference frame, which is located behind the current slice where the current block is located.

Exemplarily, the characteristic information may include, but is not limited to, one or more of a motion information attribute; a prediction mode attribute; size information; sequence-level switch control information. Of course, the above are just a few examples, to which the present application is not limited.

If the characteristic information includes the motion information attribute that meets at least one of the following conditions, it is determined that the motion information attribute meets a specific condition: 1. bidirectional prediction is used for the current block, and two reference frames corresponding to the current block come from different directions; 2. the current block includes multiple sub-blocks, and the motion information of the multiple sub-blocks is the same; 3. bidirectional prediction is used for the current block, and the weighing weights of the two reference frames corresponding to the current block are the same; 4. bidirectional prediction is used for the current block, and the two reference frames corresponding to the current block are at the same distance from a current slice; 5. bidirectional prediction is used for the current block, and the difference between the prediction values of the two reference frames corresponding to the current block is less than a preset threshold. Of course, the above are just a few examples, to which the present application is not limited.

For case 5, it is also necessary to acquire a difference between the prediction values of the two reference frames corresponding to the current block. In order to acquire the difference, the following methods can be adopted: acquiring a first prediction block from a first reference frame based on the first unidirectional motion information of the current block, and acquiring a second prediction block from a second reference frame based on the second unidirectional motion information of the current block; acquiring the difference between the prediction values of the first reference frame and the prediction value of the second reference frame based on the SAD of a down-sampled prediction value of the first prediction block and a down-sampled prediction value of the second prediction block; alternatively, acquiring a first prediction block from the first reference frame based on the first unidirectional motion information of the current block, and acquiring a second prediction block from the second reference frame based on the second unidirectional motion information of the current block; acquiring the difference between the prediction values of the first reference frame and the prediction value of the second reference frame based on the SAD of the prediction value of the first prediction block and the prediction value of the second prediction block.

If the characteristic information includes the prediction mode attribute indicating that a Merge mode based on combined inter and intra prediction is not used and/or a symmetrical motion vector difference mode is not used, it is determined that the prediction mode attribute meets a specific condition.

If the characteristic information includes the sequence-level switch control information indicating that it is allowed to use a bidirectional optical flow mode for the current block, it is determined that the sequence-level switch control information meets a specific condition.

If the characteristic information includes the size information including at least one of a width value, a height value, and an area value, it is determined that the size information meets a specific condition when at least one of the width value, the height value, and the area value in the size information satisfies a corresponding threshold condition. Exemplarily, when the size information meets at least one of the following conditions, it is determined that the size information meets a specific condition: the width value of the current block is greater than or equal to a first threshold, and is less than or equal to a second threshold; the height value of the current block is greater than or equal to a third threshold, and is less than or equal to a fourth threshold; the area value of the current block is greater than or equal to a fifth threshold, and is less than or equal to a sixth threshold. Of course, the above are just a few examples, to which the present application is not limited.

Exemplarily, the first threshold may be less than the second threshold, and both the first threshold and the second threshold are positive integer powers of 2. Both the first threshold and the second threshold are not limited. For example, the first threshold may be 8, and the second threshold may be 128. The third threshold may be less than the fourth threshold, and both the third threshold and the fourth threshold are positive integer powers of 2. Both the third threshold and the fourth threshold are not limited. For example, the third threshold may be 8, and the fourth threshold may be 128. The fifth threshold may be less than the sixth threshold, and both the fifth threshold and the sixth threshold are positive integer powers of 2. Both the fifth threshold and the sixth threshold are not limited. For example, the fifth threshold may be 64 (that is 8*8), and the sixth threshold can be 16384 (that is 128*128). Of course, the above thresholds are only examples, and there is no limitation on these thresholds.

Exemplarily, the characteristic information may include one or more of a motion information attribute, a prediction mode attribute, size information, and sequence-level switch control information. If the characteristic information includes the motion information attribute and the motion information attribute meets a specific condition, it can be indicated that the characteristic information meets a specific condition. If the characteristic information includes the prediction mode attribute, and the prediction mode attribute meets a specific condition, it can be indicated that the characteristic information meets a specific condition. If the characteristic information includes the size information, and the size information meets a specific condition, it can be indicated that the characteristic information meets a specific condition. If the characteristic information includes the sequence-level switch control information, and the sequence-level switch control information meets a specific condition, it can be indicated that the characteristic information meets a specific condition.

If the characteristic information includes at least two of a motion information attribute, a prediction mode attribute, size information, and sequence-level switch control information. For example, the characteristic information including the motion information attribute and the prediction mode attribute is taken as an example, it can be indicated that the characteristic information meets a specific condition when both the motion information attribute meets a specific condition and the prediction mode attribute meets a specific condition. For another example, the characteristic information including the motion information attribute, the size information, and the sequence-level switch control information is taken as an example, it can be indicated that the characteristic information meets a specific condition when the motion information attribute meets a specific condition, the size information meets a specific condition, and the sequence-level switch control information meets a specific condition respectively. Of course, the above processes are just a few examples, to which the present application is not limited.

Exemplarily, determining a first original prediction value based on the first unidirectional motion information of the current block and determining a second original prediction value based on the second unidirectional motion information of the current block may include, but is not limited to: determining a first reference block from the first reference frame, and determining the first original prediction value of the first reference block based on the first unidirectional motion information of the current block; wherein the first original prediction value of the central area of the first reference block is obtained by interpolating the pixel value of a pixel in the first reference frame, the first original prediction value of the edge area of the first reference block is obtained by copying the pixel value of a pixel in the first reference frame; determining the second reference block from the second reference frame based on the second unidirectional motion information of the current block, and determining the second original prediction value of the second reference block; wherein the second original prediction value of the central area of the second reference block is obtained by interpolating the pixel value of a pixel in the second reference frame, and the second original prediction value of the edge area of the second reference block is obtained by copying the pixel value of a pixel in the second reference frame.

For example, the first reference block corresponding to the current block can be determined from the first reference frame based on the first unidirectional motion information of the current block. Assuming that the size of the current block is M*M and the size of the first reference block is N*N, N may be greater than M, for example, M is 4 and N is 6. The first reference block can be divided into a central area and an edge area. The central area of the first reference block refers to an area with a size of M*M centered on the central point of the first reference block; the edge area of the first reference block refers to the area other than the center area in the first reference block. For the central area of the first reference block, the first original prediction value of the central area of the first reference block is obtained by interpolating the pixel value of a pixel in the first reference frame. For the edge area of the first reference block, the first original prediction value of the edge area of the first reference block is obtained by copying the pixel value of a pixel in the first reference frame.

The second reference block corresponding to the current block can be determined from the second reference frame based on the second unidirectional motion information of the current block. Assuming that the size of the current block is M*M and the size of the second reference block is N*N, N may be greater than M, for example, M is 4 and N is 6. The second reference block can be divided into a central area and an edge area. The central area of the second reference block refers to an area with a size of M*M centered on the central point of the second reference block, and the edge area of the second reference block refers to the area other than the center area in the second reference block. For the central area of the second reference block, the second original prediction value of the central area of the second reference block is obtained by interpolating the pixel value of a pixel in the second reference frame. For the edge area of the second reference block, the second original prediction value of the edge area of the second reference block is obtained by copying the pixel value of a pixel in the second reference frame.

Exemplarily, determining a first original prediction value based on the first unidirectional motion information of the current block and determining a second original prediction value based on the second unidirectional motion information of the current block may include, but is not limited to: determining a first reference block from the first reference frame based on the first unidirectional motion information of the current block, and determining the first original prediction value of the first reference block, wherein the first original prediction value is obtained by interpolating the pixel value of a pixel in the first reference frame; determining the second reference block from the second reference frame based on the second unidirectional motion information of the current block, and determining the second original prediction value of the second reference block. The second original prediction value is obtained by interpolating the pixel value of a pixel in the second reference frame. For example, the first reference block corresponding to the current block can be determined from the first reference frame based on the first unidirectional motion information of the current block. Assuming that the size of the current block is M*M, the size of the first reference block may be M*M. The second reference block corresponding to the current block can be determined from the second reference frame based on the second unidirectional motion information of the current block. Assuming that the size of the current block is M*M, the size of the second reference block may be M*M.

At step 202, a horizontal velocity is determined based on the first original prediction value and the second original prediction value.

Exemplarily, the horizontal velocity refers to a horizontal direction (i.e., the X direction) velocity of a sub-block, corresponding to the current block, in a reference frame (i.e., the sub-block, located in the reference frame, corresponding to the current block). Or, it refers to a horizontal direction (i.e., the X direction) velocity of the sub-block, corresponding to the sub-block of the current block, in the reference frame (i.e., the sub-block, located in the reference frame, corresponding to the sub-block of the current block).

Exemplarily, determining a horizontal velocity based on the first original prediction value and the second original prediction value may include but is not limited to:

Implementation 1: determining an autocorrelation coefficient S1 of a horizontal gradient sum and a cross-correlation coefficient S3 between the difference of the time domain prediction values and a horizontal gradient sum based on the first original prediction value and the second original prediction value; and then, determining the horizontal velocity based on the autocorrelation coefficient S1, the velocity threshold, the cross-correlation coefficient S3, a first amplification factor and a second amplification factor.

Implementation 2: if a first preset condition is met, determining a cross-correlation coefficient S2 between the horizontal gradient sum and the vertical gradient sum, a cross-correlation coefficient S6 between the difference of the time domain prediction values and the vertical gradient sum based on the first original prediction value and the second original prediction value; then determining the horizontal velocity based on the cross-correlation coefficient S2, the velocity threshold, the cross-correlation coefficient S6, a first amplification factor and a second amplification factor; if the first preset condition is not met, determining an autocorrelation coefficient S1 of a horizontal gradient sum and a cross-correlation coefficient S3 between the difference of the time domain prediction values and a horizontal gradient sum based on the first original prediction value and the second original prediction value; and determining the horizontal velocity based on the autocorrelation coefficient S1, the velocity threshold, the cross-correlation coefficient S3, a first amplification factor and a second amplification factor.

Exemplarily, a first preset condition is determined based on the cross-correlation coefficient S2, an autocorrelation coefficient S5 of the vertical gradient sum.

Implementation 3: if the second preset condition is met, determining an autocorrelation coefficient S1 of the horizontal gradient sum, a cross-correlation coefficient S2 between the horizontal gradient sum and the vertical gradient sum, a cross-correlation coefficient S3 between the difference of the time domain prediction values and the horizontal gradient sum, an autocorrelation coefficient S5 of the vertical gradient sum, a cross-correlation coefficient S6 between the difference of the time domain prediction values and the vertical gradient sum based on the first original prediction value and the second original prediction value; determining the horizontal velocity based on the autocorrelation coefficient S1, the cross-correlation coefficient S2, the cross-correlation coefficient S3, the autocorrelation coefficient S5, the cross-correlation coefficient S6, the velocity threshold, a first amplification factor and a second amplification factor; if the second preset condition is not met, determining an autocorrelation coefficient S1 of a horizontal gradient sum and a cross-correlation coefficient S3 between the difference of the time domain prediction values and a horizontal gradient sum based on the first original prediction value and the second original prediction value; and determining the horizontal velocity based on the autocorrelation coefficient S1, the velocity threshold, the cross-correlation coefficient S3, the first amplification factor and the second amplification factor.

Exemplarily, a second preset condition is determined based on the cross-correlation coefficient S2, the autocorrelation coefficient S5.

At step 203: a vertical velocity is determined based on the first original prediction value and the second original prediction value.

Exemplarily, the vertical velocity refers to the vertical direction (i.e., the Y direction) velocity of the sub-block, corresponding to the current block, in the reference frame (i.e., the sub-block, located in the reference frame, corresponding to the current block). Or, it refers to the vertical direction (i.e., the Y direction) velocity of the sub-block corresponding to the sub-block of the current block in the reference frame (i.e., the sub-block, located in the reference frame, corresponding to the sub-block of the current block).

Exemplarily, determining a vertical velocity based on the first original prediction value and the second original prediction value may include but is not limited to:

Implementation 1: determining a cross-correlation coefficient S2 between the horizontal gradient sum and the vertical gradient sum, an autocorrelation coefficient S5 of the vertical gradient sum, a cross-correlation coefficient S6 between the difference of the time domain prediction values and the vertical gradient sum based on the first original prediction value and the second original prediction value; and then, determining the vertical velocity based on the cross-correlation coefficient S2, the autocorrelation coefficient S5, the cross-correlation coefficient S6, the velocity threshold, the horizontal velocity, a first amplification factor, and a second amplification factor.

Implementation 2: acquiring an untruncated horizontal velocity without truncation processing based on the first original prediction value and the second original prediction value, and determining the vertical velocity based on the untruncated horizontal velocity.

Exemplarily, an autocorrelation coefficient S1 of the horizontal gradient sum, a cross-correlation coefficient S2 between the horizontal gradient sum and the vertical gradient sum, a cross-correlation coefficient S3 between the difference of the time domain prediction values and the horizontal gradient sum, an autocorrelation coefficient S5 of the vertical gradient sum, a cross-correlation coefficient S6 between the difference of the time domain prediction values and the vertical gradient sum can be determined based on the first original prediction value and the second original prediction value can be determined. Then, the untruncated horizontal velocity can be determined based on the autocorrelation coefficient S1, the cross-correlation coefficient S3, a first amplification factor and a second amplification factor, and the vertical velocity can be determined based on the cross-correlation coefficient S2, the autocorrelation coefficient S5, the cross-correlation coefficient S6, the velocity threshold, the untruncated horizontal velocity, the first amplification factor, and the second amplification factor.

Implementation 3: if a third preset condition is met, determining an autocorrelation coefficient S5 of the vertical gradient sum, a cross-correlation coefficient S6 between the difference of the time domain prediction values and the vertical gradient sum based on the first original prediction value and the second original prediction value; and then, determining the vertical velocity based on the autocorrelation coefficient S5, the cross-correlation coefficient S6, the velocity threshold, a first amplification factor and a second amplification factor; if the third preset condition is not met, determining a cross-correlation coefficient S2 between the horizontal gradient sum and the vertical gradient sum, an autocorrelation coefficient S5 of the vertical gradient sum, a cross-correlation coefficient S6 between the difference of the time domain prediction values and the vertical gradient sum based on the first original prediction value and the second original prediction value; then, determining the vertical velocity based on the cross-correlation coefficient S2, the autocorrelation coefficient S5, the cross-correlation coefficient S6, the velocity threshold, the horizontal velocity, the first amplification factor, and the second amplification factor.

Exemplarily, the third preset condition can be determined based on the horizontal velocity.

At step 202 and step 203, the horizontal gradient sum, the vertical gradient sum, and the difference of the time domain prediction values can be determined based on the first original prediction value, the second original prediction value, the first amplification factor, and the second amplification factor. The autocorrelation coefficient S1 of the horizontal gradient sum, the cross-correlation coefficient S2 between the horizontal gradient sum and the vertical gradient sum, the cross-correlation coefficient S3 between the difference of the time domain prediction values and the horizontal gradient sum, the autocorrelation coefficient S5 of the vertical gradient sum, the cross-correlation coefficient S6 between the difference of the time domain prediction values and the vertical gradient sum can be determined based on the horizontal gradient sum, the vertical gradient sum, the difference of the time domain prediction values.

Exemplarily, the cross-correlation coefficient S2 may be located between a first cross-correlation coefficient threshold and a second cross-correlation coefficient threshold, and the cross-correlation coefficient S6 may be located between a third cross-correlation coefficient threshold and a fourth cross-correlation coefficient threshold.

For example, if the cross-correlation coefficient S2 obtained based on the first original prediction value, the second original prediction value, the first amplification factor, and the second amplification factor is less than the first cross-correlation coefficient threshold, the cross-correlation coefficient S2 is updated to the first cross-correlation coefficient threshold. If the cross-correlation coefficient S2 obtained based on the first original prediction value, the second original prediction value, the first amplification factor, and the second amplification factor is greater than the second cross-correlation coefficient threshold, the cross-correlation coefficient S2 is updated to the second cross-correlation coefficient threshold. If the cross-correlation coefficient S2 obtained based on the first original prediction value, the second original prediction value, the first amplification factor, and the second amplification factor is greater than or equal to the first cross-correlation coefficient threshold, and is less than or equal to the second cross-correlation coefficient threshold, the cross-correlation coefficient S2 is kept unchanged.

If the cross-correlation coefficient S6 obtained based on the first original prediction value, the second original prediction value, the first amplification factor, and the second amplification factor is less than the third cross-correlation coefficient threshold, the cross-correlation coefficient S6 is updated to the third cross-correlation coefficient threshold. If the cross-correlation coefficient S6 obtained based on the first original prediction value, the second original prediction value, the first amplification factor, and the second amplification factor is greater than the fourth cross-correlation coefficient threshold, the cross-correlation coefficient S6 is updated to the fourth cross-correlation coefficient threshold. If the cross-correlation coefficient S6 obtained based on the first original prediction value, the second original prediction value, the first amplification factor, and the second amplification factor is greater than or equal to the third cross-correlation coefficient threshold, and is less than or equal to the fourth cross-correlation coefficient threshold, the cross-correlation coefficient S6 is kept unchanged.

Exemplarily, the first amplification factor may be the smaller of 5 and (BD−7), or the larger of 1 and (BD−11). Of course, the above is only an example of the first amplification factor, to which the present application is not limited and which can be configured according to experience.

Exemplarily, the second amplification factor may be the smaller of 8 and (BD−4), or the larger of 4 and (BD−8). Of course, the above is only an example of the second amplification factor, to which the present application is not limited and which can be configured according to experience.

Exemplarily, the velocity threshold may be M powers of 2, and M is the difference between 13 and BD, or the larger of 5 and (BD−7). Of course, the above is only an example of the velocity threshold, to which the present application is not limited and which can be configured according to experience.

Exemplarily, BD (bit depth) is the bit depth, which represents the bit width required for each chroma or luminance pixel value.

At step 204, a prediction compensation value is acquired based on the horizontal velocity and the vertical velocity.

Exemplarily, acquiring a prediction compensation value based on the horizontal velocity and the vertical velocity may include but not limited to: determining a horizontal gradient and a vertical gradient based on the first original prediction value, the second original prediction value and a gradient right-shift bit number, and acquiring a prediction compensation value based on the horizontal velocity, the vertical velocity, the horizontal gradient and the vertical gradient.

Exemplarily, a gradient right-shift bit number may be the larger of 2 and (14-BD), or the larger of 6 and (BD−6). Of course, the above is only an example of the gradient right-shift bit number, to which the present application is not limited and which can be configured according to experience.

At step 205, a target prediction value is acquired based on the first original prediction value, the second original prediction value and the prediction compensation value.

Exemplarily, when the above method is used to acquire the target prediction value of the current block, if the characteristic information of the current block meets a specific condition, a first original prediction value for the current block is determined based on first unidirectional motion information of the current block, and a second original prediction value for the current block is determined based on second unidirectional motion information of the current block. The horizontal velocity for the current block is determined based on the first original prediction value and the second original prediction value, and the vertical velocity for the current block is determined based on the first original prediction value and the second original prediction value. Then, the prediction compensation value for the current block is acquired based on the horizontal velocity and the vertical velocity, and the target prediction value for the current block is acquired based on the first original prediction value, the second original prediction value and the prediction compensation value. So far, the target prediction value for the current block is acquired successfully.

Exemplarily, when the current block is divided into at least one sub-block and the above method is used to acquire a target prediction value of each sub-block of the current block, if the characteristic information of the current block meets a specific condition, then for each sub-block of the current block, the first original prediction value for the sub-block is determined based on the first unidirectional motion information of the sub-block (which is the same as the first unidirectional motion information of the current block), and the second original prediction value for the sub-block is determined based on the second unidirectional motion information of the sub-block (which is the same as the second unidirectional motion information of the current block). The horizontal velocity for the sub-block is determined based on the first original prediction value and the second original prediction value, and the vertical velocity for the sub-block is determined based on the first original prediction value and the second original prediction value. Then, the prediction compensation value for the sub-block is acquired based on the horizontal velocity and the vertical velocity, and the target prediction value for the sub-block is acquired based on the first original prediction value, the second original prediction value and the prediction compensation value.

So far, the target prediction value for the sub-block is acquired successfully. In fact, the target prediction value of the current block is obtained after the target prediction value of each sub-block of the current block is obtained.

As can be seen from the above technical solutions, in the embodiments of the present application, the first original prediction value can be determined based on the first unidirectional motion information of the current block; the second original prediction value can be determined based on the second unidirectional motion information of the current block; the horizontal velocity and the vertical velocity can be determined based on the first original prediction value and the second original prediction value; the prediction compensation value can be acquired based on the horizontal velocity and the vertical velocity, and the target prediction value can be acquired based on the prediction compensation value. By the above method, the current block or a target prediction value of a sub-block of the current block can be acquired based on the optical flow method, thereby improving the friendliness of hardware implementation, and bringing about an improvement in encoding performance.

Embodiment 2: an embodiment of the present application proposes an encoding and decoding method, which can be applied to a decoding side or a encoding side. Refer to FIG. 3, which is a schematic flowchart of the encoding and decoding method. Exemplarily, if the characteristic information of the current block meets a specific condition, the following steps may be performed for each sub-block of the current block to acquire the target prediction value of each sub-block of the current block.

At step 301, if the characteristic information of the current block meets a specific condition, the first original prediction value of a sub-block is determined based on the first unidirectional motion information of the current block (i.e., the first unidirectional motion information of the sub-block of the current block), and the second original prediction value of the sub-block is determined based on the second unidirectional motion information of the current block (i.e., the second unidirectional motion information of the sub-block of the current block).

Exemplarily, if the current block is a bidirectional block (i.e., the current block is a block using bidirectional prediction), the bidirectional motion information of the current block can be acquired, and there is no limitation on the acquiring method. This bidirectional motion information includes motion information in two different directions, The two motion information in two different directions is called the first unidirectional motion information (such as a first motion vector and a first reference frame index) and the second unidirectional motion information (such as a second motion vector and a second reference frame index). The first reference frame (such as reference frame 0) can be determined based on the first unidirectional motion information, and is located in front of the current slice where the current block is located. The second reference frame (such as reference frame 1) can be determined based on the second unidirectional motion information, and is located behind the current slice where the current block is located;

Exemplarily, for each sub-block of the current block, the first unidirectional motion information of the sub-block is the same as the first unidirectional motion information of the current block, the second unidirectional motion information of the sub-block is the same as the second unidirectional motion information of the current block.

Exemplarily, the characteristic information may include one or more of a motion information attribute, a prediction mode attribute, size information, and sequence-level switch control information. Regarding the characteristic information meeting a specific condition, refer to step 201, which will not be repeated here.

Exemplarily, determining a first original prediction value of the sub-block based on the first unidirectional motion information of the current block and determining a second original prediction value of the sub-block based on the second unidirectional motion information of the current block may include: determining a first reference block corresponding to the sub-block of the current block from the first reference frame based on the first unidirectional motion information of the current block, and determining the first original prediction value $I^{(0)}(x, y)$ of the first reference block; determining the second reference block corresponding to the sub-block of the current block from the second reference frame based on the second unidirectional motion information of the current block, and determining the second original prediction value $I^{(1)}(x, y)$ of the second reference block. Regarding the determination method of the first original prediction value and the second original prediction value, reference can be made to step 201, which is not repeated here.

At step 302, a horizontal gradient sum, a vertical gradient sum, and a difference of time domain prediction values are determined based on the first original prediction value and the second original prediction value of the sub-block. For example, the horizontal gradient sum, the vertical gradient sum, and the difference of the time domain prediction values are determined based on the first original prediction value of the sub-block, the second original prediction value of the sub-block, a first amplification factor, and a second amplification factor.

At step 303, the autocorrelation coefficient S1 of the horizontal gradient sum (hereinafter referred to as the autocorrelation coefficient S1), the cross-correlation coefficient S2 between the horizontal gradient sum and the vertical gradient sum (hereinafter referred to as the cross-correlation coefficient S2), the cross-correlation coefficient S3 between the difference of the time domain prediction values and the horizontal gradient sum (hereinafter referred to as the cross-correlation coefficient S3), the autocorrelation coefficient S5 of the vertical gradient sum (hereinafter referred to as the autocorrelation coefficient S5), and the cross-correlation coefficient S6 between the difference of the time domain prediction values and the vertical gradient sum (hereinafter referred to as the cross-correlation coefficient S6) are determined based on the horizontal gradient sum, the vertical gradient sum, and the difference of the time domain prediction values.

At step 304, the horizontal velocity of the sub-block, corresponding to the sub-block of the current block, in the reference frame is determined based on one or more of the autocorrelation coefficient S1, the cross-correlation coefficient S2, the cross-correlation coefficient S3, the autocorrelation coefficient S5, and the cross-correlation coefficient S6.

At step 305, the vertical velocity of the sub-block, corresponding to the sub-block of the current block, in the reference frame is determined based on one or more of the autocorrelation coefficient S1, the cross-correlation coefficient S2, the cross-correlation coefficient S3, the autocorrelation coefficient S5, and the cross-correlation coefficient S6.

At step 306, a prediction compensation value of the sub-block of the current block is acquired based on the horizontal velocity and the vertical velocity.

At step 307: the target prediction of the sub-block of the current block is acquired based on the first original prediction value of the sub-block of the current block, the second original prediction value of the sub-block of the current block, and the prediction compensation value of the sub-block of the current block.

Exemplarily, reference can be made to Embodiment 1 for the flow of step 301 to step 307, which will not be repeated here.

Embodiment 3: the encoding/decoding side needs to determine whether the characteristic information of the current block meets a specific condition. If so, the technical solution of the embodiment in the present application is adopted to acquire the target prediction value of the current block or a sub-block of the current block. This technical solution may also be referred to as a bidirectional optical flow mode. If not, there is no need to adopt the target prediction value acquisition method proposed in this application.

If the characteristic information at least meets the following conditions at the same time, it is determined that the characteristic information of the current block meets a specific condition.

The bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information (such as the width value, height value, area value, etc.) of the current block is within a limited range.

Example 4: If the characteristic information at least meets the following conditions at the same time, it is determined that the characteristic information of the current block meets a specific condition.

Bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information (such as the width value, height value, area value) of the current block is within a limited range.

The current block includes multiple sub-blocks, and the motion information of the multiple sub-blocks is the same, i.e., the motion information of each sub-block of the current block can be exactly the same, i.e., a sub-block motion information mode is not used for the current block.

Exemplarily, not using the sub-block motion information mode for the current block may include: not using an Affine mode or an SBTMVP mode for the current block. Wherein, the Affine mode is mode using an affine motion model, and the SBTMVP (sub-block-based temporal motion vector prediction) mode is a mode for acquiring motion information of the entire block in the time domain. If the Affine mode or the SBTMVP mode is used for the current block, the motion information of each sub-block within the current block is likely to be different. Therefore, the Affine mode or the SBTMVP mode may be not used for the current block.

Embodiment 5: If the characteristic information at least meets the following conditions at the same time, it is determined that the characteristic information of the current block meets a specific condition.

Bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information (such as the width value, height value, area value) of the current block is within a limited range.

The current block includes multiple sub-blocks, and the motion information of the multiple sub-blocks is the same, i.e., the motion information of each sub-block of the current block can be exactly the same, i.e., the sub-block motion information mode is not used for the current block.

Bidirectional prediction is used for the current block, and the weighing weights of the two reference frames corresponding to the current block are the same.

Embodiment 6: If the characteristic information at least meets the following conditions at the same time, it is determined that the characteristic information of the current block meets a specific condition.

Bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information (such as the width value, height value, area value) of the current block is within a limited range.

The current block includes multiple sub-blocks, and the motion information of the multiple sub-blocks is the same, i.e., the motion information of each sub-block of the current block can be exactly the same, i.e., the sub-block motion information mode is not used for the current block.

Bidirectional prediction is used for the current block, and the weighing weights of the two reference frames corresponding to the current block are the same;

CIIP mode (combined inter-picture merge and intra-picture prediction) is not used for the current block.

Embodiment 7: If the characteristic information at least meets the following conditions at the same time, it is determined that the characteristic information of the current block meets a specific condition.

Bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information (such as the width value, height value, area value) of the current block is within a limited range.

The current block includes multiple sub-blocks, and the motion information of the multiple sub-blocks is the same, i.e., the motion information of each sub-block of the current block can be exactly the same, i.e., the sub-block motion information mode is not used for the current block.

Bidirectional prediction is used for the current block, and the weighing weights of the two reference frames corresponding to the current block are the same;

SMVD (Symmetric Motion Vector Difference) mode is not used for the current block. The two MVDs in the bidirectional motion information in the SMVD mode are symmetric, i.e., only one motion vector difference MVD needs to be encoded, and the other one is -MVD.

Embodiment 8: if the characteristic information at least meets the following conditions at the same time, it is determined that the characteristic information of the current block meets a specific condition.

The sequence-level switch control information indicates that it is allowed to use a bidirectional optical flow mode for the current block. In other words, the sequence-level control allows the bidirectional optical flow mode to be enabled, i.e., the sequence-level control switch is on, which means that it is allowed to use a bidirectional optical flow mode for the current block;

Bidirectional prediction is used for the current block, and the two reference frames corresponding to the current block come from different directions, i.e., one reference frame corresponding to the current block is located in front of the current slice, and the other reference frame corresponding to the current block is located behind the current slice.

The size information of the current block (such as the width value, height value, area value) is within a limited range.

The current block includes multiple sub-blocks, and the motion information of the multiple sub-blocks is the same, i.e., the motion information of each sub-block of the current block can be exactly the same, i.e., the sub-block motion information mode is not used for the current block.

Bidirectional prediction is used for the current block, and the weighing weights of the two reference frames corresponding to the current block are the same.

Embodiment 9: a condition "bidirectional prediction is used for the current block, and the two reference frames corresponding to the current block come from different directions" in any one of the above Embodiment 3 to Embodiment 8 is modified to "bidirectional prediction is used for the current block, and the two reference frames corresponding to the current block come from different directions, and the two reference frames corresponding to the current block are at the same distance from the current slice".

For example, if the display sequence number of the current slice is POC, and the display sequence numbers of the two reference frames corresponding to the current block are POC0 and POC1 respectively, the two reference frames come from different directions, which is equivalent to (POC−POC0)*(POC−POC1)<0, the distances between the two reference frames and the current slice are the same, which is equivalent to the value of (POC−POC0) equal to the value of (POC1−POC).

Embodiment 10: if the characteristic information meets at least the following conditions, it is determined that the characteristic information of the current block meets a specific condition.

The sequence-level switch control information indicates that it is allowed to use a bidirectional optical flow mode for the current block. In other words, the sequence-level control allows the bidirectional optical flow mode to be enabled, i.e., the sequence-level control switch is on, which means that it is allowed to adopt a bidirectional optical flow mode for the current block.

Embodiment 11: if the characteristic information meets at least the following conditions, it is determined that the characteristic information of the current block meets a specific condition.

Bidirectional prediction is used for the current block, and the difference between the prediction values of the two reference frames corresponding to the current block may be less than the preset threshold TH_SAD. Exemplarily, the following method may be adopted to acquire the difference between the prediction values of the two reference frames corresponding to the current block.

Implementation 1: a first prediction block corresponding to the sub-block of the current block from the first reference frame is acquired based on the first unidirectional motion information of the current block, a second prediction block corresponding to the sub-block of the current block from the second reference frame is acquired based on the second unidirectional motion information of the current block, and the difference between the prediction values of the first reference frame and the second reference frame is acquired based on the SAD (Sum of Absolute Difference) of the prediction value of the first prediction block and the prediction value of the second prediction block.

In Implementation 1, the difference between the prediction values is the SAD of the prediction value (hereinafter referred to as pred0) of the first prediction block and the prediction value (hereinafter referred to as pred1) of the second prediction, i.e., the SAD of pred0 and pred1 for all pixels. For example, the difference between the prediction values of the first reference frame and the second reference frame can be determined by the following formula. In this formula, $pred_0(i,j)$ is the prediction value of pred0 in the i-th column and j-th row of pred0, $pred_1(i,j)$ is the prediction value of pred1 in the i-th column and j-th row of pred1, n is the total number of pixels, abs(x) represents the absolute value of x, H represents the height value, and W represents the width value.

$$cost=\Sigma_{i=1}^{H}\Sigma_{j}^{W}abs(pred_0(i,j)-(pred_1(i,j))$$

Implementation 2: a first prediction block corresponding to the sub-block of the current block from the first reference frame is acquired based on the first unidirectional motion information of the current block, and a second prediction block corresponding to the sub-block of the current block from the second reference frame is acquired based on the second unidirectional motion information of the current block. The difference between the prediction values of the first reference frame and the second reference frame is acquired based on the SAD between the down-sampled prediction value of the first prediction block (i.e., the prediction value obtained after down-sampling the prediction value of the first prediction block) and the down-sampled prediction value of the second prediction block (i.e., the prediction value obtained after down-sampling the prediction value of the second prediction block).

In implementation 2, the difference between the prediction values is the SAD between the prediction value (hereinafter referred to as pred0) of the first prediction block after down-sampled N times and the prediction value (hereinafter referred to as pred1) of the second prediction block after down-sampled N times. For example, the difference between the prediction values of the first reference frame and the second reference frame can be determined by the following formula. In this formula, $pred_0(i,j)$ is the prediction value of pred0 in the i-th column and j-th row of pred0, $pred_1(i,j)$ is the prediction value of pred1 in the i-th column and j-th row of pred1, n is the total number of pixels, abs(x) represents the absolute value of x, H represents the height value, and W represents the width value, N is a positive integer, preferably 2.

$$SAD(\text{horizontally down-sampled N times})=\Sigma_{i=1}^{H/N}\Sigma_{j}^{W}abs(pred_0(1+N(i-1),j)-pred_1(1+N(i-1),j))$$

Embodiment 12: In the above embodiment, the size information of the current block is within a limited range, which can be one of the following cases.

Case 1: the width value of the current block is within the range of a first interval [Wmin, Wmax]; the height of the current block is within the range of a second interval [Hmin, Hmax]; Wmin, Wmax, Hmin, Hmax are all positive integer powers of 2; for example, Wmin is 8, Wmax is 128, Hmin is 8, Hmax is 128.

The area value of the current block is within the range of a third interval [Smin, Smax]; Smin and Smax are both positive integer powers of 2; for example, Smin is 64 and Smax is 128*128=16384.

In the above embodiment, [a, b] means that it is greater than or equal to a and less than or equal to b.

Case 2: the width value of the current block is within the range of the first interval [Wmin, Wmax]; Wmin and Wmax are both positive integer powers of 2; for example, Wmin is 8, Wmax is 128.

Case 3: the height value of the current block is within the range of the second interval [Hmin, Hmax]; Hmin and Hmax are both positive integer powers of 2; for example, Hmin is 8, Hmax is 128.

Exemplarily, if any of the following conditions is met, the weights of the two reference frames corresponding to the current block are the same:

condition 1: a method that allows different weights is not used for the current block;

condition 2: a method with different weights is allowed for the current block, for example enabling a block-level weighted prediction method BCW (Bi-prediction with CU based weighting), and the two weights of the current block are exactly the same;

condition 3: a method with different weights is not used for the current slice where the current block is located;

condition 4: a method with different weights is allowed for the current slice where the current block is located, e.g., enabling a frame-level weighted prediction method, and the two weights of the current slice are exactly the same.

Embodiment 13: the encoding/decoding side needs to determine the first original prediction value of the sub-block based on the first unidirectional motion information of the current block, and determine the second original prediction value of the sub-block based on the second unidirectional motion information of the current block. For example, the first reference block corresponding to the sub-block of the current block is determined from the first reference frame based on the first unidirectional motion information of the current block, and the first original prediction value) $I^{(0)}(x, y)$ of the first reference block is determined. The second reference block corresponding to the sub-block of the current block from the second reference frame is determined based on the second unidirectional motion information of the current block, and the second original prediction value $I^{(1)}(x, y)$ of the second reference block is determined.

For example, a first reference block is determined from the first reference frame based on the first unidirectional motion information of the current block, and the first original prediction value $I^{(0)}(x, y)$ of the first reference block is determined. The first original prediction value $I^{(0)}(x, y)$ of the central area of the first reference block is obtained by interpolating the pixel value of a pixel in the first reference frame. The first original prediction value $I^{(0)}(x, y)$ of the edge area of the first reference block is obtained by copying the pixel value of a pixel in the first reference frame. The second reference block is determined from the second reference frame based on the second unidirectional motion information of the current block, and the second original prediction value $I^{(1)}(x, y)$ of the second reference block is determined. The second original prediction value $I^{(1)}(x, y)$ of the central area of the second reference block is obtained by interpolating the pixel value of a pixel in the second reference frame. The second original prediction value $I^{(1)}(x, y)$ of the edge area of the second reference block is obtained by copying the pixel value of a pixel in the second reference frame.

Figure 4:
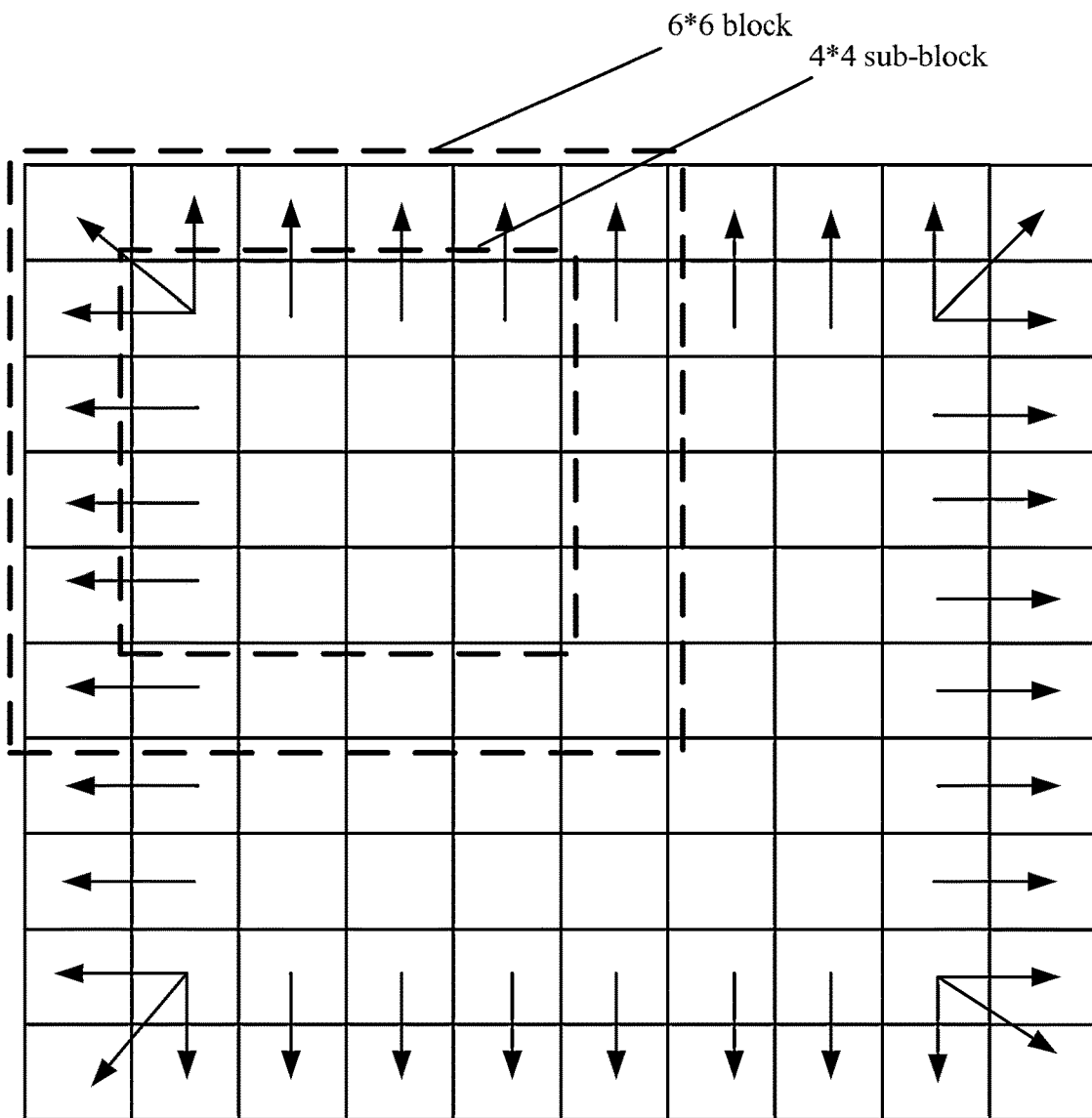
FIG. 4 is a schematic diagram of a reference block corresponding to a sub-block of a current block according to an embodiment of the present application.

Refer to FIG. 4, assuming that the size of the sub-block is 4*4, and the size of the first reference block is 6*6, the central area of the first reference block refers to an area with a size of 4*4 centered on the central point of the first reference block, the first original prediction value of the central area of the first reference block is obtained by interpolating the pixel value of a pixel in the first reference frame, which will not be repeated here. The edge area of the first reference block refers to the area other than the central area in the first reference block (i.e., the area with 1 row and 1 column at the upper, lower, left, and right portions respectively, except the central area). The first original prediction value of the edge area of the first reference block is obtained by copying the pixel value of a pixel in the first reference frame. As shown in FIG. 4, the pixel values of the pixels in the first reference frame are copied to the edge area of the first reference block. Obviously, FIG. 4 is only an example, and the pixel values of other pixels can also be used for copying.

Obviously, in the above method, for the edge area of the first reference block, it can be acquired by copying the nearest integer pixel value of a pixel in the first reference frame to avoid additional interpolation process and indirectly avoid accessing additional reference pixels.

Regarding the second original prediction value of the central area of the second reference block and the second original prediction value of the edge area of the second reference block, the process of acquiring the second original prediction value can refer to the process of acquiring the first original prediction value, which will not be repeated here.

For example, a first reference block is determined from the first reference frame based on the first unidirectional motion information of the current block, and the first original prediction value of the first reference block is determined. The first original prediction value of the first reference block is all obtained by interpolating the pixel value of a pixel in the first reference frame. The second reference block is determined from the second reference frame based on the second unidirectional motion information of the current block, and the second original prediction value of the second reference block is determined. The second original prediction value of the second reference block is obtained by interpolating the pixel value of a pixel in the second reference frame. For example, assume that the size of the sub-block is 4*4, the size of the first reference block is 4*4, and the size of the second reference block is 4*4. The first original prediction value of all areas of the first reference block is obtained by interpolating the pixel value of a pixel in the first reference frame. The first original prediction value of all areas of the second reference block is obtained by interpolating the pixel value of a pixel in the first reference frame.

Embodiment 14: After acquiring the first original prediction value of the sub-block and the second original prediction value of the sub-block, the encoding/decoding side determines the horizontal gradient sum, the vertical gradient sum, and the difference of the time domain prediction values based on the first original prediction value and the second original prediction value of the sub-block. For example, the horizontal gradient sum, the vertical gradient sum, and the difference of the time domain prediction values are determined based on the first original prediction value of the sub-block, the second original prediction value of the sub-block, the first amplification factor, and the second amplification factor. For example, the horizontal gradient sum is determined by formula (1), the vertical gradient sum is determined by formula (2), and the difference of time domain prediction values is determined by formula (3):

$$\psi_x(i, j) = \left(\frac{\partial I^{(1)}}{\partial x}(i, j) + \frac{\partial I^{(0)}}{\partial x}(i, j)\right) \gg n_a \qquad (1)$$

-continued $$\psi_y(i,j) = \left(\frac{\partial I^{(1)}}{\partial y}(i,j) + \frac{\partial I^{(0)}}{\partial y}(i,j)\right) \gg n_a \quad (2)$$

$$\theta(i,j) = \left(I^{(1)}(i,j) \gg n_b\right) - \left(I^{(0)}(i,j) \gg n_b\right) \quad (3)$$

Exemplarily, $$\frac{\partial I^{(k)}(x,y)}{\partial x}$$

represents the horizontal gradient, $$\frac{\partial I^{(k)}(x,y)}{\partial y}$$

represents the vertical gradient. The following parameters in formula (1) to formula (3) can be determined by formulas (4) and (5):

$$\frac{\partial I^{(1)}}{\partial x}(i,j), \frac{\partial I^{(0)}}{\partial x}(i,j), \frac{\partial I^{(1)}}{\partial y}(i,j) \text{ and } \frac{\partial I^{(0)}}{\partial y}(i,j).$$

$$\frac{\partial I^{(k)}}{\partial x}(i,j) = \left(I^{(k)}(i+1,j) - I^{(k)}(i-1,j)\right) \gg \text{shift1} \quad (4)$$

$$\frac{\partial I^{(k)}}{\partial y}(i,j) = \left(I^{(k)}(i,j+1) - I^{(k)}(i,j-1)\right) \gg \text{shift1} \quad (5)$$

$\psi_x(i,j)$ represents the horizontal gradient sum, $\psi_y(0)$ represents the vertical gradient sum, and $\theta(i,j)$ is the difference of the time domain prediction values.

$I^{(0)}(x, y)$ represents the first original prediction value of the sub-block, and $I^{(1)}(x, y)$ represents the second original prediction value of the sub-block. Assuming that the size of the sub-block is 4*4, see the Embodiment 13, $I^{(0)}(x, y)$ is the first original prediction value of the first reference block with a size of 4*4 or the first original prediction value of the first reference block with a size of 6*6; $I^{(1)}(x, y)$ is the second original prediction value of the second reference block with a size of 4*4 or the second original prediction value of the second reference block with a size of 6*6. For example, $I^{(0)}(x, y)$ is the first original prediction value of the first reference block with a size of 4*4, $I^{(1)}(x, y)$ is the second original prediction value of the second reference block with a size of 4*4. $I^{(k)}(i,j)$ represents the pixel value of a pixel at coordinates (i,j). For example, $I^{(0)}(i,j)$ represents the pixel value of a pixel at coordinates (i,j) in the first reference block, which corresponds to the first original prediction value of the sub-block; $I^{(1)}(i,j)$ represents the pixel value of a pixel at coordinates (i,j) in the second reference block, which corresponds to the second original prediction value of the sub-block.

$n_a$ may represent the first amplification factor, the first amplification factor $n_a$ may be the smaller of 5 and (BD−7), or the larger of 1 and (BD−11). $n_b$ may represent the second amplification factor, the second amplification factor $n_b$ may be the smaller of 8 and (BD−4), or the larger of 4 and (BD−8). shift1 may represent the gradient right-shift bit number, the gradient right-shift bit number shift1 may be the larger of 2 and (14−BD), or the larger of 6 and (BD−6).

» means right-shift. For example, »$n_a$ means right-shift by $n_a$, i.e., divided by the $n_a$ powers of 2. »$n_b$ means right-shift by $n_b$, i.e., divided by the n b powers of 2. »shift1 means right-shift by shift1, i.e., divided by the shift1 powers of 2.

BD (bit depth) may be a bit depth, which may represent the bit width required for each chroma or luminance pixel value. For example, BD may be 10 or 8. Normally, BD may be a known value.

Embodiment 15: after obtaining the horizontal gradient sum, vertical gradient sum, and the difference of the time domain prediction values, the encoding/decoding side can also determine the autocorrelation coefficient S1 of the horizontal gradient sum (hereinafter referred to as the autocorrelation coefficient S1), the cross-correlation coefficient S2 between the horizontal gradient sum and the vertical gradient sum (hereinafter referred to as the cross-correlation coefficient S2), the cross-correlation coefficient S3 between the difference of the time domain prediction values and the horizontal gradient sum (hereinafter referred to as the cross-correlation coefficient S3), the autocorrelation coefficient S5 of the vertical gradient sum (hereinafter referred to as the autocorrelation coefficient S5), and the cross-correlation coefficient S6 between the difference of the time domain prediction values and the vertical gradient sum (hereinafter referred to as the cross-correlation coefficient S6) based on the horizontal gradient sum, the vertical gradient sum, and the difference of the time domain prediction values. For example, the autocorrelation coefficient S1, the cross-correlation coefficient S2, the cross-correlation coefficient S3, the autocorrelation coefficient S5, and the cross-correlation coefficient S6 can be determined by the following formulas.

$$S_1 = \Sigma_{(i,j) \in \Omega} \psi_x(i,j) \cdot \psi_x(i,j) \quad (6)$$

$$S_2 = \Sigma_{(i,j) \in \Omega} \psi_x(i,j) \cdot \psi_y(i,j) \quad (7)$$

$$S_3 = \Sigma_{(i,j) \in \Omega} \theta(i,j) \cdot \psi_x(i,j) \quad (8)$$

$$S_3 = \Sigma_{(i,j) \in \psi} \psi_y(i,j) \cdot \psi_y(i,j) \quad (9)$$

$$S_6 = \Sigma_{(i,j) \in \Omega} \theta(i,j) \cdot \psi_y(i,j) \quad (10)$$

$\psi_x(i,j)$ represents the horizontal gradient sum, $\psi_y(i,j)$ represents the vertical gradient sum, and $\theta(i,j)$ is the difference of the time domain prediction values.

Assuming that the size of the sub-block is 4*4, $\Omega$ represents a window corresponding to the 4*4 sub-block, or $\Omega$ represents the 6*6 window around the 4*4 sub-block. For each coordinate point (i,j) in $\Omega$, $\psi_x(i,j)$, and $\theta(i,j)$ can be determined through the above-mentioned embodiments first, and then, S1, S2, S3, S5, S6 can be determined based on) $\psi_x(i,j)$), $\psi_y(i,j)$ and $\theta(i,j)$.

Embodiment 16: after obtaining the cross-correlation coefficient S2 and the cross-correlation coefficient S6, the cross-correlation coefficient S2 can be limited between the first cross-correlation coefficient threshold and the second cross-correlation coefficient threshold. For example, if the cross-correlation coefficient S2 is less than the first cross-correlation coefficient threshold, the cross-correlation coefficient S2 can be updated to the first cross-correlation coefficient threshold. If the cross-correlation coefficient S2 is greater than the second cross-correlation coefficient threshold, the cross-correlation coefficient S2 can be updated to the second cross-correlation coefficient threshold. The cross-correlation coefficient S6 can be limited between the third cross-correlation coefficient threshold and the fourth cross-correlation coefficient threshold. For example, if the cross-correlation coefficient S6 is less than the third cross-correlation coefficient threshold, the cross-correlation coefficient S6 can be updated to the third cross-correlation coefficient threshold. If the cross-correlation coefficient S6 is greater than the fourth cross-correlation coefficient threshold, the cross-correlation coefficient S6 can be updated to the fourth cross-correlation coefficient threshold. The first cross-correlation coefficient threshold may be less than the second cross-correlation coefficient threshold, and the third cross-correlation coefficient threshold may be less than the fourth cross-correlation coefficient threshold.

Exemplarily, the following size limitations may be performed on the cross-correlation coefficient S2 and the cross-correlation coefficient S6, so as to prevent the intermediate results from overflowing, i.e., so that the bit width does not exceed a certain range. $-(1 \ll THS2)$ represents the first cross-correlation coefficient threshold, $1 \ll THS2$ represents the second cross-correlation coefficient threshold, $-(1 \ll THS6)$ represents the third cross-correlation coefficient threshold, and $1 \ll THS6$ represents the fourth cross-correlation coefficient threshold. For example, to prevent the bit width from exceeding 32 bits, THS2 can be 25, and THS6 can be 27. Of course, the above values are just a few examples, to which the present application is not limited.

$$S_2 = \text{clip3}(-(1 \ll THS2), (1 \ll THS2), S_2) \quad (11)$$

$$S_6 = \text{clip3}(-(1 \ll THS6), (1 \ll THS6), S_6) \quad (12)$$

Clip3(a, b, x) indicates that if x is less than a, then Clip3(a, b, x)=a; if x is greater than b, then Clip3(a, b, x)=b; if x is greater than or equal to a and less than or equal to b, then Clip3(a, b, x)=x. Therefore, formula (11) indicates that if $S_2$ is less than $-(1 \ll THS2)$, then $S_2$ is $-(1 \ll THS2)$; if $S_2$ is greater than $(1 \ll THS2)$, then $S_2$ is $(1 \ll THS2)$, otherwise, $S_2$ remains unchanged. Similarly, formula (12) indicates that if $S_6$ is less than $-(1 \ll THS6)$, then $S_6$ is $-(1 \ll THS6)$; if $S_6$ is greater than $(1 \ll THS6)$, then $S_6$ is $(1 \ll THS6)$, otherwise, $S_6$ remains unchanged. $\ll$ means shift left.

Embodiment 17: after obtaining the autocorrelation coefficient S1, the cross-correlation coefficient S2, the cross-correlation coefficient S3, the autocorrelation coefficient S5, and the cross-correlation coefficient S6, the horizontal velocity of the sub-block of the current block in the reference frame can be determined based on one or more of the autocorrelation coefficient S1, the cross-correlation coefficient S2, the cross-correlation coefficient S3, the autocorrelation coefficient S5, and the cross-correlation coefficient S6. The vertical velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, the horizontal velocity can be determined based on the autocorrelation coefficient S1, the velocity threshold, the cross-correlation coefficient S3, the first amplification factor and the second amplification factor. See the following formula, it is an example of determining the horizontal velocity based on the above parameters.

$$v_x = S_1 > 0? \text{ clip3}(-th'_{BIO}, th'_{BIO}, -((S_3 \cdot 2^{n_b - n_a}) \gg \lfloor \log_2 S_1 \rfloor)) : 0 \quad (13)$$

In the above formula, if $S_1 > 0$ is true, $v_x = \text{clip3}(-th'_{BIO}, th'_{BIO}, -((S_3 \cdot 2^{n_b - n_a}) \gg \lfloor \log_2 S_1 \rfloor))$; if $S_1 > 0$ is not true, $v_x = 0$. $v_x$ represents the horizontal velocity, $th'_{BIO}$ represents the velocity threshold, which is configured to limit the horizontal velocity $v_x$ between $-th'_{BIO}$ and $th'_{BIO}$, i.e., the horizontal velocity $v_x$ is greater than or equal to $-th'_{BIO}$, and the horizontal velocity $v_x$ is less than or equal to $th'_{BIO}$. The velocity threshold $th'_{BIO}$ may be M powers of 2, and M is the difference between 13 and BD, or the larger of 5 and (BD−7). For example, $th'_{BIO} = 2^{13-BD}$ or $th'_{BIO} = 2^{max(5, BD-7)}$, wherein BD is the bit depth.

$n_a$ may represent the first amplification factor, the first amplification factor $n_b$ may be the smaller of 5 and (BD−7), or the larger of 1 and (BD−11). $n_b$ may represent the second amplification factor, the second amplification factor $n_b$ may be the smaller of 8 and (BD−4), or the larger of 4 and (BD−8). $\gg$ means right shift, $\lfloor \cdot \rfloor$ means rounding down.

Both the first amplification factor $n_b$ and the second amplification factor $n_b$ can be configured according to experience, and the second amplification factor $n_b$ can be greater than the first amplification factor $n_a$. The first amplification factor $n_b$ and the second amplification factor $n_b$ are configured to amplify the value interval of the horizontal velocity $v_x$. For example, assuming that $n_b - n_a$ is 3, then $2^{n_b - n_a}$ is 8, the value interval of the horizontal velocity $v_x$ can be enlarged by 8 times; and assuming that $n_b - n_a$ is 4, then $2^{n_b - n_a}$ is 16, the value interval of the horizontal velocity $v_x$ can be enlarged by 16 times, and so on.

Clip3(a, b, x) indicates that if x is less than a, then Clip3(a, b, x)=a; if x is greater than b, then Clip3(a, b, x)=b; if x is greater than or equal to a and less than or equal to b, then Clip3(a, b, x)=x. In the above formula, $-th'_{BIO}$ is a, $th'_{BIO}$ is b, $-((S_3 \cdot 2^{n_b - n_a}) \gg \lfloor \log_2 S_1 \rfloor)$ is x. In summary, if $-((S_3 \cdot 2^{n_b - n_a}) \gg \lfloor \log_2 S_1 \rfloor)$ is greater than $-th'_{BIO}$ and less $th'_{BIO}$, then the horizontal velocity $v_x$ is $-((S_3 \cdot 2^{n_b - n_a}) \gg \lfloor \log_2 S_1 \rfloor)$.

For example, the vertical velocity can be determined based on the cross-correlation coefficient S2, the autocorrelation coefficient S5, the cross-correlation coefficient S6, the velocity threshold, the horizontal velocity, the first amplification factor, and the second amplification factor, see the formula below.

$$v_y = S_6 > 0? \text{clip3}(-th'_{BIO}, th'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)) : 0 \quad (14)$$

It can be seen from the above formula that if $s_5 > 0$ is true, then $v_y = \text{clip3}(-th'_{BIO}, th'_{BIO}, -(s_6 \cdot 2^{n_b - n_a} - ((v_x S_{2,m}) \ll n_{S_2} + v_x S_{2,s})/2) \gg \lfloor \log_2 S_5 \rfloor))$; if $s_5 > 0$ is not true, then $v_y = 0$.

$v_y$ represents the vertical velocity, $v_x$ represents the horizontal velocity, $th'_{BIO}$ represents the velocity threshold, which is configured to limit the vertical velocity between $-th'_{BIO}$ and $th'_{BIO}$, i.e., the vertical velocity is greater than or equal to $-th'_{BIO}$ and is less than or equal to $th'_{BIO}$. The velocity threshold $th'_{BIO}$ may be M powers of 2, and M is the difference between 13 and BD, or the larger of 5 and (BD−7). For example, $th'_{BIO} = 2^{13-BD}$ or $th'_{BIO} = 2^{max(6, BD-7)}$, wherein BD is the bit depth.

$n_a$ may represent the first amplification factor, the first amplification factor $n_b$ may be the smaller of 5 and (BD−7), or the larger of 1 and (BD−11). $n_b$ may represent the second amplification factor, the second amplification factor $n_b$ may be the smaller of 8 and (BD−4), or the larger of 4 and (BD−8). $\gg$ means right shift, $\lfloor \cdot \rfloor$ means rounding down.

Both the first amplification factor $n_b$ and the second amplification factor $n_b$ can be configured according to experience, and the second amplification factor $n_b$ can be greater than the first amplification factor $n_a$. The first amplification factor $n_b$ and the second amplification factor $n_b$ are configured to amplify the value interval of the vertical velocity $v_y$. For example, assuming that $n_b - n_a$ is 3, then $2^{n_b - n_a}$ is 8, the value interval of the vertical velocity $v_y$ can be enlarged by 8 times; and assuming that $n_b - n_a$ is 4, then $2^{n_b - n_a}$ is 16, the value interval of the vertical velocity $v_y$ can be enlarged by 16 times, and so on.

Clip3(a, b, x) indicates that if x is less than a, then Clip3(a, b, x)=a; if x is greater than b, then Clip3(a, b, x)=b; if x is greater than or equal to a and less than or equal to b, then Clip3(a, b, x)=x. In the above formula, $-th'_{BIO}$ is a, $th'_{BIO}$ is b, $-((S_6 \cdot 2^{n_b-n_a}-((v_x S_{2,m}) \ll n_{S_2}+v_x S_{2,s})) \gg \lfloor \log_2 S_5 \rfloor)$ is x. In summary, if $-((S_6 \cdot 2^{n_b-n_a}-((v_x S_{2,m}) \ll n_{S_2}+v_x S_{2,s})/2) \gg \lfloor \log_2 S_5 \rfloor)$ is greater than $-th'_{BIO}$ and less than $th'_{BIO}$, then the vertical velocity $v_y$ is $-((S_6 \cdot 2^{n_b-n_a}-((v_x S_{2,m}) \ll n_{S_2}+v_x S_{2,s})/2) \gg \lfloor \log_2 S_5 \rfloor)$.

Exemplarily, in the above formula, $n_{S_2}=12$, $S_{2,m}=S_2 \gg n_{S_2}$, $S_{2,s}=S_2 \& (2^{n_{s2}}-1)$.

Embodiment 18: after obtaining the autocorrelation coefficient S1, the cross-correlation coefficient S2, the cross-correlation coefficient S3, the autocorrelation coefficient S5, and the cross-correlation coefficient S6, the horizontal velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6. The vertical velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, the horizontal velocity can be determined based on the autocorrelation coefficient S1, the velocity threshold, the cross-correlation coefficient S3, the first amplification factor and the second amplification factor. See the following formula as an example of determining the horizontal velocity based on the above parameters.

$$v_x = S_1 > 0 ! clip3(-th'_{BIO}, th'_{BIO}, ((S_3 \cdot 2^{n_b-n_a}) \gg \lfloor \log_2 S_1 \rfloor)):0 \quad (15)$$

Compared with formula (13), formula (15) removes the negative sign in front of $((S_3 \cdot 2^{n_b-n_a}) \gg \lfloor \log_2 S_1 \rfloor)$, and the other content is the same as formula (13), and the meaning of each parameter is also the same as that in formula (13), which will not be repeated here.

For example, the vertical velocity can be determined based on the cross-correlation coefficient S2, the autocorrelation coefficient S5, the cross-correlation coefficient S6, the velocity threshold, the horizontal velocity, the first amplification factor, and the second amplification factor, see the formula below.

$$v_y = S_5 > 0 ! clip3(-th'_{BIO}, th'_{BIO}, ((S_6 \cdot 2^{n_b-n_a}-((v_x S_{2,m}) \ll n_{S_2}+v_x S_{2,s})/2) \gg \lfloor \log_2 S_5 \rfloor)):0 \quad (16)$$

Compared with formula (14), formula (16) removes the negative sign in front of $((S_6 \cdot 2^{n_b-n_a}-((v_x S_{2,m}) \ll n_{S_2}+v_x S_{2,s})/2) \gg \lfloor \log_2 S_5 \rfloor)$, and the other content is the same as formula (14), and the meaning of each parameter is also the same as that in formula (14), which will not be repeated here.

Embodiment 19: after obtaining the autocorrelation coefficient S1, the cross-correlation coefficient S2, the cross-correlation coefficient S3, the autocorrelation coefficient S5, and the cross-correlation coefficient S6, the horizontal velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, if the first preset condition is met, the horizontal velocity can be determined based on the cross-correlation coefficient S2, the velocity threshold, the cross-correlation coefficient S6, the first amplification factor and the second amplification factor. If the first preset condition is not met, the horizontal velocity can be determined based on the autocorrelation coefficient S1, the velocity threshold, the cross-correlation coefficient S3, the first amplification factor and the second amplification factor. The first preset condition is determined based on the cross-correlation coefficient S2 and the autocorrelation coefficient S5, as shown in the following formula.

If the first preset condition is met, $$v_x = S_2 == 0 ! clip3(-th'_{BIO}, th'_{BIO}, -((S_6 \cdot 2^{n_b-n_a}) \gg \lfloor \log_2 S_2 \rfloor)):0 \quad (17)$$

If the first preset condition is not met, $$v_x = S_1 > 0 ! clip3(-th'_{BIO}, th'_{BIO}, -((S_3 \cdot 2^{n_b-n_a}) \gg \lfloor \log_2 S_1 \rfloor)):0 \quad (18)$$

The above-mentioned first preset condition may include: $|S_2|>k|S_5|$, $|\cdot|$ represents the absolute value, k is a threshold which can be set arbitrarily, such as 8. $S_2==0$? in formula (17) means to determine whether $S_2$ is equal to 0. When the first preset condition is met, if $S_2==0$ is true, then $v_x = clip3(-th'_{BIO}, th'_{BIO}, -((S_6 \cdot 2^{n_b-n_a}) \gg \lfloor \log_2 S_2 \rfloor))$; if $S_2==0$ is not true, then $v_x=0$. $v_x$ represents the horizontal velocity, $th'_{BIO}$ represents the velocity threshold, $n_a$ represents the first amplification factor, $n_b$ represents the second amplification factor, $\gg$ represents the right shift, and $\lfloor \cdot \rfloor$ represents rounding down.

Clip3(a, b, x) indicates that if x is less than a, then Clip3(a, b, x)=a; if x is greater than b, then Clip3(a, b, x)=b; if x is greater than or equal to a and less than or equal to b, then Clip3(a, b, x)=x. In the above formula, $-th'_{BIO}$ is a, $th'_{BIO}$ is b, $-((S_6 \cdot 2^{n_b-n_a}) \gg \lfloor \log_2 S_2 \rfloor)$ is x. In summary, if $-((S_6 \cdot 2^{n_b-n_a}) \gg \lfloor \log_2 S_2 \rfloor)$ is greater than $-th'_{BIO}$ and less than $th'_{BIO}$, then the horizontal velocity $v_x$ is $-((S_6 \cdot 2^{n_b-n_a}) \gg \lfloor \log_2 S_2 \rfloor)$.

If the first preset condition is not met, formula (18) is the same as formula (13), and will not be repeated here.

Embodiment 20: after obtaining the autocorrelation coefficient S1, the cross-correlation coefficient S2, the cross-correlation coefficient S3, the autocorrelation coefficient S5, and the cross-correlation coefficient S6, the horizontal velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, if the second preset condition is met, the horizontal velocity can be determined based on the autocorrelation coefficient S1, the cross-correlation coefficient S2, the cross-correlation coefficient S3, the autocorrelation coefficient S5, the cross-correlation coefficient S6, the velocity threshold, a first amplification factor and a second amplification factor. If the second preset condition is not met, the horizontal velocity can be determined based on the autocorrelation coefficient S1, the velocity threshold, the cross-correlation coefficient S3, the first amplification factor and the second amplification factor. The second preset condition is determined based on the cross-correlation coefficient S2 and the autocorrelation coefficient S5, as shown in the following formula: if the second preset condition is met, then $S_{tmp}=S_1 \cdot S_5-S_2 \cdot S_2$, $$v_x = S_{tmp}==0 ! clip3(-th'_{BIO}, th'_{BIO}, -(((S_3 \cdot S_5-S_6 \cdot S_2) \cdot 2^{n_b-n_a}) \gg \lfloor \log_2 S_{tmp} \rfloor)):0 \quad (19)$$

If the second preset condition is not met, $$v_x = S_1 > 0 ! clip3(-th'_{BIO}, th'_{BIO}, -((S_3 \cdot 2^{n_b-n_a})) \gg \lfloor \log_2 S_1 \rfloor)):0 \quad (20)$$

If the second preset condition is met, $S_{tmp}$ is first determined based on $S_1$, $S_2$, and $S_5$. Refer to the above formula for the specific determination method. Then, if $S_{tmp}==0$ is true, then $v_x=\text{clip3}(-\text{th}'_{BIO}, \text{th}'_{BIO}, -(((S_3 \cdot S_5 - S_6 \cdot S_2) \cdot 2^{n_b-n_a}) \gg \lfloor \log_2 S_{tmp} \rfloor))$; if $S_{tmp}==0$ is not true, then $v_x=0$. $v_x$ represents the horizontal velocity, $\text{th}'_{BIO}$ represents the velocity threshold, $n_a$ represents the first amplification factor, $n_b$ represents the second amplification factor, $\gg$ represents the right shift, and $\lfloor \cdot \rfloor$ represents rounding down.

In the above formula, Clip3(a, b, x) indicates that if x is less than a, then Clip3(a, b, x)=a; if x is greater than b, then Clip3(a, b, x)=b; if x is greater than or equal to a and less than or equal to b, then Clip3(a, b, x)=x. In the above formula, $-\text{th}'_{BIO}$ is a, $\text{th}'_{BIO}$ is b, $-(((S_3 \cdot S_5 - S_6 \cdot S_2) \cdot 2^{n_b-n_a}) \gg \lfloor \log_2 S_{tmp} \rfloor)$ is x. In summary, if $-(((S_3 \cdot S_5 - S_6 \cdot S_2) \cdot 2^{n_b-n_a}) \gg \lfloor \log_2 S_{tmp} \rfloor)$ is greater than $-\text{th}'_{BIO}$ and less than $\text{th}'_{BIO}$, the horizontal velocity $v_x$ can be $-(((S_3 \cdot S_5 - S_6 \cdot S_2) \cdot 2^{n_b-n_a}) \gg \lfloor \log_2 S_{tmp} \rfloor)$.

If the second preset condition is not met, formula (20) is the same as formula (13), and will not be repeated here.

The above-mentioned second preset condition may include but is not limited to: $|S_2|>k|S_5|$, $|\cdot|$ represents the absolute value, k is a threshold which can be set arbitrarily, such as 8. Obviously, this second preset condition is just an example, to which the present application is not limited.

Embodiment 21: for Embodiment 19, if the first preset condition is not met, the formula for determining the horizontal velocity is changed to formula (15); for Embodiment 20, if the second preset condition is not met, the formula for determining the horizontal velocity is changed to formula (15).

Embodiment 22: after obtaining the autocorrelation coefficient S1, the cross-correlation coefficient S2, the cross-correlation coefficient S3, the autocorrelation coefficient S5, and the cross-correlation coefficient S6, the vertical velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, an untruncated horizontal velocity can be determined based on the autocorrelation coefficient S1, the cross-correlation coefficient S3, the first amplification factor and the second amplification factor, and the vertical velocity can be determined based on the cross-correlation coefficient S2, the autocorrelation coefficient S5, the cross-correlation coefficient S6, the velocity threshold, the untruncated horizontal velocity, the first amplification factor, and the second amplification factor.

See the following formula.

$$v_{x,org}=S_1>0 ?\, -((S_3 \cdot 2^{n_b-n_a}) \gg \lfloor \log_2 S_1 \rfloor):0 \tag{21}$$

$$v_y=S_5>0 ?\, clip3(-\text{th}'_{BIO}, \text{th}'_{BIO}, -((S_6 \cdot 2^{n_b-n_a}-((v_{x\_org} S_{2,m}) \ll n_{S_2} + v_{x\_org} S_{2,s})/2) \gg \lfloor \log_2 S_5 \rfloor)):0 \tag{22}$$

It can be seen from the above formula that if $S_1>0$ is true, then $v_{x\_org}=((S_3 \cdot 2^{n_b-n_a}) \gg \lfloor \log_2 S_1 \rfloor)$; if $S_1>0$ is not true, then $v_{x\_org}=0$. Compared with $v_x$ in the above embodiment, in this embodiment, the velocity threshold $\text{th}'_{BIO}$ is not used to limit the horizontal velocity between $-\text{th}'_{BIO}$ and $\text{th}'_{BIO}$. Therefore, $v_{x\_org}$ is called the untruncated horizontal velocity, i.e., no truncation is performed. In other words, this untruncated horizontal velocity $v_{x\_org}$ is not limited between $\text{th}'_{BIO}$ and $\text{th}'_{BIO}$.

It can be seen from the above formula that if $S_5>0$ is true, then $v_y=\text{clip3}(-\text{th}'_{BIO}, \text{th}'_{BIO}, -((S_6 \cdot 2^{n_b-n_a}-((v_{x\_org} S_{2,m}) \ll n_{S_2} + v_{x\_org} S_{2,s})/2) \gg \lfloor \log_2 S_5 \rfloor))$; if $s_5>0$ is not true, then $v_y=0$.

$v_y$ represents the vertical velocity, $v_{x\_org}$ represents the untruncated horizontal velocity, $\text{th}'_{BIO}$ represents the velocity threshold, $n_a$ represents the first amplification factor, $n_b$ represents the second amplification factor, $\gg$ represents the right shift, and $\lfloor \cdot \rfloor$ represents rounding down. Clip3(a, b, x) means that if x is less than a, then Clip3(a, b, x)=a; if x is greater than b, then Clip3(a, b, x)=b; if x is greater than or equal to a and less than or equal to b, then Clip3(a, b, x)=x. In the above formula, $-\text{th}'_{BIO}$ is a, $\text{t}'_{BIO}$ is b, $-((S_6 \cdot 2^{n_b-n_a}-((v_{x\_org} S_{2,m}) \ll n_{S_2} + v_{x\_org} S_{2,s})/2) \gg \lfloor \log_2 S_5 \rfloor)$ is x. In summary, if $-((S_6 \cdot 2^{n_b-n_a}-((v_{x\_org} S_{2,m}) \ll n_{S_2} + v_{x\_org} S_2)/2) \gg \lfloor \log_2 S_5 \rfloor)$ is greater than $-\text{th}'_{BIO}$ and less than $\text{th}'_{BIO}$, then the vertical velocity $v_y$ is $-((S_6 \cdot 2^{n_b-n_a}-((v_{x\_org} S_{2,m}) \ll n_{S_2} + v_{x\_org} S_{2,s})/2) \gg \lfloor \log_2 S_5 \rfloor)$.

Exemplarily, in the above formula, $n_{S_2}=12$, $S_{2,m}=S_2 \gg n_{S_2}$, $S_{2,s}=S_2 \& (2^{n_{s2}}-1)$.

Embodiment 23: after obtaining the autocorrelation coefficient S1, the cross-correlation coefficient S2, the cross-correlation coefficient S3, the autocorrelation coefficient S5, and the cross-correlation coefficient S6, the vertical velocity of the sub-block, corresponding to the sub-block of the current block, in the reference frame can be determined based on one or more of the autocorrelation coefficient S1, the cross-correlation coefficient S2, the cross-correlation coefficient S3, the autocorrelation coefficient S5, and the cross-correlation coefficient S6.

For example, if the third preset condition is met, the vertical velocity is determined based on the autocorrelation coefficient S5, the cross-correlation coefficient S6, the velocity threshold, the first amplification factor and the second amplification factor. If the third preset condition is not met, the vertical velocity is determined based on the cross-correlation coefficient S2, the autocorrelation coefficient S5, the cross-correlation coefficient S6, the velocity threshold, the horizontal velocity, the first amplification factor, and the second amplification factor. Exemplarily, the third preset condition may be determined based on the horizontal velocity.

See the following formula: if the third preset condition is met, then:

$$v_y=S_5>0 ?\, clip3(-\text{th}'_{BIO}, \text{th}'_{BIO}, -((S_6 \cdot 2^{n_b-n_a}) \gg \lfloor \log_2 s_5 \rfloor)):0 \tag{23}$$

If the third preset condition is not met, $$v_y=S_5>0 ?\, clip3(-\text{th}'_{BIO}, \text{th}'_{BIO}, -((S_6 \cdot 2^{n_b-n_a}-((v_x S_{2,m}) \ll n_{S_2} + v_x S_{2,s})/2) \gg \lfloor \log_2 S_5 \rfloor)):0 \tag{24}$$

Exemplarily, the third preset condition may be: if $v_x$ is $-\text{th}'_{BIO}$ or $\text{th}'_{BIO}$ i.e., $v_x$ is the minimum or maximum value.

When the third preset condition is met, if $S_5>0$ is true, then $v_y=\text{clip3}(-\text{th}'_{BIO}, \text{th}'_{BIO}, -((S_6 \cdot 2^{n_b-n_a}) \gg \lfloor \log_2 S_5 \rfloor))$, if $S_5>0$ is not true, then $v_y=0$. Exemplarily, $v_y$ represents the vertical velocity, $\text{th}'_{BIO}$ represents the velocity threshold, $n_a$ represents the first amplification factor, $n_b$ represents the second amplification factor, $\gg$ represents the right shift, and $\lfloor \cdot \rfloor$ represents rounding down. Clip3(a, b, x) means that if x is less than a, then Clip3(a, b, x)=a; if x is greater than b, then Clip3(a, b, x)=b; if x is greater than or equal to a and less than or equal to b, then Clip3(a, b, x)=x. In the above formula, $-\text{th}'_{BIO}$ is a, $\text{th}'_{BIO}$ is b, $-((S_6 \cdot 2^{n_b-n_a}) \gg \lfloor \log_2 S_5 \rfloor)$ is x. In summary, if $-((S_6 \cdot 2^{n_b-n_a}) \gg \lfloor \log_2 S_5 \rfloor)$ is greater than $-\text{th}'_{BIO}$ and less than $\text{th}'_{BIO}$, then the vertical velocity $v_y$ is $-((S_6 \cdot 2^{n_b-n_a}) \gg \lfloor \log_2 S_5 \rfloor)$.

If the third preset condition is not met, formula (24) is the same as formula (14), and will not be repeated here.

Embodiment 24: for Embodiment 23, if the third preset condition is not met, the formula for determining the vertical velocity is changed to formula (16).

Embodiment 25: In the above embodiment, the first amplification factor $n_a$ may be the smaller of 5 and (BD−7), i.e., $n_a$=min(5, BD−7); or, the first amplification factor $n_a$ may be the larger of 1 and (BD−11), i.e., $n_a$=Max(1, BD−11). Of course, the above is only an example of the first amplification factor, to which the present application is not limited and which can be configured according to experience. The second amplification factor $n_b$ may be the smaller of 8 and (BD−4), i.e., $n_b$=min(8, BD−4); or, the second amplification factor $n_b$ may be the larger of 4 and (BD−8), i.e., $n_b$=Max(4, BD−8). Of course, the above is only an example of the second amplification factor, to which the present application is not limited and which can be configured according to experience. The velocity threshold th'$_{BIO}$ may be M powers of 2, and M is the difference between 13 and BD, or the larger of 5 and (BD−7). For example, th'$_{BIO}$=$2^{13-BD}$ or th'$_{BIO}$=$2^{max(5,BD-7)}$. Of course, the above is only an example of the velocity threshold, to which the present application is not limited and which can be configured according to experience.

The right-shift bit number of the autocorrelation coefficient and the cross-correlation coefficient of the gradient can be reduced, and the required bit width (preservation precision) of the autocorrelation coefficient and the cross-correlation coefficient can be increased by setting the first amplification factor $n_a$ to the larger of 1 and (BD−11). The right-shift bit number of the autocorrelation coefficient and the cross-correlation coefficient of the gradient can be reduced, and the required bit width (preservation precision) of the autocorrelation coefficient and the cross-correlation coefficient can be increased by setting the second amplification factor $n_b$ to the larger of 4 and (BD−8). The required bit width (preservation precision) of the horizontal velocity $v_x$ and the vertical velocity $v_y$ can be increased by setting the velocity threshold th'$_{BIO}$ to $2^{max(5,BD-7)}$.

Embodiment 26: after acquiring the horizontal velocity $v_x$ and the vertical velocity $v_y$, the encoding/decoding side can acquire the prediction compensation value of the sub-block of the current block based on the horizontal velocity $v_x$ and the vertical velocity $v_y$. For example, a horizontal gradient and a vertical gradient is determined based on the first original prediction value of the sub-block, the second original prediction value of the sub-block, and the right-shift bit number of the gradient. The prediction compensation value is acquired based on the horizontal velocity $v_x$, the vertical velocity $v_y$, the horizontal gradient and the vertical gradient.

For example, the encoding/decoding side can acquire the prediction compensation value b(x, y) of the sub-block of the current block through the following formula.

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + \\ rnd\left(\left(v_y\left(\frac{\partial I^{(1)}(x, y)}{\partial y} - \frac{\partial I^{(0)}(x, y)}{\partial y}\right)\right)/2\right) \quad (25)$$

Exemplarily, $$\frac{\partial I^{(k)}(x, y)}{\partial x}$$

represents the horizontal gradient, $$\frac{\partial I^{(k)}(x, y)}{\partial y}$$

represents the vertical gradient. The following parameters of $$\frac{\partial I^{(1)}}{\partial x}(i, j), \frac{\partial I^{(0)}}{\partial x}(i, j), \frac{\partial I^{(1)}}{\partial y}(i, j) \text{ and } \frac{\partial I^{(0)}}{\partial y}(i, j)$$

in the above formulas can be determined by the following formulas.

$$\frac{\partial I^{(k)}}{\partial x}(i, j) = \left(I^{(k)}(i+1, j) - I^{(k)}(i-1, j)\right) \gg \text{shift1} \quad (26)$$

$$\frac{\partial I^{(k)}}{\partial y}(i, j) = \left(I^{(k)}(i, j+1) - I^{(k)}(i, j-1)\right) \gg \text{shift1} \quad (27)$$

$I^{(k)}(i,j)$ represents the pixel value of a pixel at coordinates (i,j). For example, $I^{(0)}(i,j)$ represents the pixel value of a pixel at the coordinate (i,j) in the first reference block, which corresponds to the first original prediction value of the sub-block; $I^{(1)}(i,j)$ represents the pixel value of a pixel at the coordinate (i,j) in the second reference block, which corresponds to the second original prediction value of the sub-block. For example,)/(° (x, y) represents the first original prediction value of the sub-block, and $I^{(1)}$(x, y) represents the second original prediction value of the sub-block. Assuming that the size of the sub-block is 4*4, $I^{(0)}$(x, y) is the first original prediction value of the first reference block with a size of 4*4 or the first original prediction value of the first reference block with a size of 6*6; $I^{(1)}$(x, y) is the second original prediction value of the second reference block with a size of 4*4 or the second original prediction value of the second reference block with a size of 6*6. For example, $I^{(0)}$(x, y) is the first original prediction value of the first reference block with a size of 4*4, and $I^{(1)}$(x, y) is the second original prediction value of the second reference block with a size of 4*4.

$v_x$ represents the horizontal velocity, $v_y$ represents the vertical velocity, » represents the right shift, rnd is round and represents the rounding operation, shift1 represents the gradient right-shift bit number, »shift1 represents the right shift shift1. The gradient right-shift bit number shifts can be the larger of 2 and (14-BD), i.e., shift1=max(2, 14−BD), or shift1 can be the larger of 6 and (BD−6), i.e., shift1=max(6, BD−6). Of course, the above is only an example of the gradient right-shift bit number, to which the present application is not limited and which can be configured according to experience. The gradient right-shift bit number can be increased, i.e., the bit width (preservation precision) required for the gradient can be reduced by setting shift1 to the larger of 6 and (BD−6). BD represents the bit depth, i.e., the bit width required for the luma value, which generally is 10 or 8.

Embodiment 27: the encoding/decoding side can acquire the target prediction value of the sub-block of the current block based on the first original prediction value of the sub-block of the current block, the second original prediction value of the sub-block of the current block, and the prediction compensation value of the sub-block of the current block. For example, the encoding/decoding side can acquire the target prediction value pred$_{BDOF}$(x, y) of the sub-block of the current block through the following formula.

$$pred_{BDOF}(x,y)=(I^{(0)}(x,y)+I^{(1)}(x,y)+b(x,y)+0_{offset})\gg shift \quad (28)$$

In the above formula, $I^{(0)}$(x, y) represents the first original prediction value of the sub-block, and $I^{(1)}$(x, y) represents the second original prediction value of the sub-block, b(x, y) represents the prediction compensation value of the sub-block, » represents the right shift, and »shift represents the right shift shift.

Exemplarily, $0_{offset}=2^{shift-1}+2^{14}$, shift=15−BD, BD represents the bit depth.

Of course, the above method is only an example of acquiring the target prediction value of the sub-block, to which the present application is not limited.

Embodiment 28: if the current block is divided into multiple sub-blocks, the above-mentioned embodiment can be adopted to determine the target prediction value of each sub-block, i.e., the prediction signal is adjusted for each sub-block of the current block (such as a sub-block with a size of 4*4), so as to obtain the target prediction value of each sub-block. In this embodiment, if the target condition is met, the signal adjustment process of a certain sub-block can also be stopped in advance, i.e., the method of the foregoing embodiment is no longer adopted to determine the target prediction value of the sub-block.

For example, the current block is divided into sub-block 1, sub-block 2, sub-block 3 and sub-block 4. The encoding/decoding side first determines the target prediction value of sub-block 1 by using the foregoing embodiment, and then determines the target prediction value of sub-block 2 by using the foregoing embodiment. Assuming that the target condition is met, the encoding/decoding side no longer determines the target prediction value of sub-block 3 and the target prediction value of sub-block 4 by using the foregoing embodiment, i.e., the signal adjustment process of sub-block 3 and sub-block 4 is stopped in advance.

Exemplarily, if the difference between the prediction values of the two sub-blocks of the current block is less than a certain threshold TH_SUB_SAD, it can be determined that the target condition is met, and the signal adjustment process for the remaining sub-blocks can be stopped in advance. For example, if the difference between the prediction values of sub-block 1 is less than the threshold TH_SUB_SAD, and the difference between the prediction values of sub-block 2 is less than the threshold TH_SUB_SAD, it is determined that the target condition is met, and the signal adjustment process for the remaining sub-blocks (i.e., sub-block 3 and sub-block 4) is stopped in advance.

For another example, the current block is divided into multiple sub-blocks, and for each sub-block, the encoding/decoding side determines whether the target condition is met before determining the target prediction value of the sub-block by using the foregoing embodiment. If the target condition is met, the method of the foregoing embodiment is no longer adopted to determine the target prediction value of the sub-block, i.e., the signal adjustment process for the sub-block is stopped in advance. If the target condition is not met, the method of the foregoing embodiment may be adopted to determine the target prediction value of the sub-block.

Exemplarily, if the difference between the prediction values of the sub-block is less than a certain threshold TH_SUB_SAD, it can be determined that the target condition is met, and the signal adjustment process for the sub-block can be stopped in advance. For example, if the difference between the prediction values of the sub-block 1 is less than the threshold TH_SUB_SAD, it can be determined that the target condition is met, and the signal adjustment process for the sub-block 1 can be stopped in advance.

Exemplarily, in order to determine the difference between the prediction values of the sub-block, the following method may be adopted.

Implementation 1, the difference between the prediction values may be the SAD of the prediction value (hereinafter referred to as pred0) of the first prediction block (i.e., the first prediction block corresponding to the sub-block acquired from the first reference frame based on the first unidirectional motion information of the current block) and the prediction value (hereinafter referred to as pred1) of the second prediction block (i.e., the second prediction block corresponding to the sub-block acquired from the second reference frame based on the second unidirectional motion information of the current block), the SAD of pred0 and pred1 for all pixels. For example, the difference between the prediction values of the first reference frame and the second reference frame can be determined by the following formula. In this formula, pred$_0$(i,j) is the prediction value of pred0 in the i-th column and j-th row of pred0, pred$_1$(i,j) is the prediction value of pred1 in the i-th column and j-th row of pred1, n is the total number of pixels, abs(x) represents the absolute value of x, H represents the height value, and W represents the width value.

$$cost=\Sigma_{i=1}^{H}\Sigma_{j}^{W}abs(pred_0(i,j)-pred_1(i,j))$$

Implementation 2, the difference between the prediction values may also be the SAD of the prediction value (referred to as pred0, which is the prediction value obtained after down-sampling the prediction value of the first prediction block) down-sampled N times of the first prediction block and the prediction value (referred to as pred1, which is the prediction value obtained after down-sampling the prediction value of the second prediction block) down-sampled N times of the second prediction block. For example, the difference between the prediction values of the first reference frame and the second reference frame can be determined by the following formula. Wherein pred$_0$(i,j) is the prediction value of pred0 in the i-th column and j-th row of pred0, pred$_1$(i,j) is the prediction value of pred1 in the i-th column and j-th row of pred1, n is the total number of pixels, abs(x) represents the absolute value of x, H represents the height value, and W represents the width value, N is a positive integer, preferably 2.

$$SAD(\text{horizontally down-sampled } N \text{ times})= \Sigma_{i=1}^{H/N}\Sigma_{j}^{W}abs(pred_0(1+N(i-1),j)-pred_1(1+N(i-1),j))$$

Figure 5:
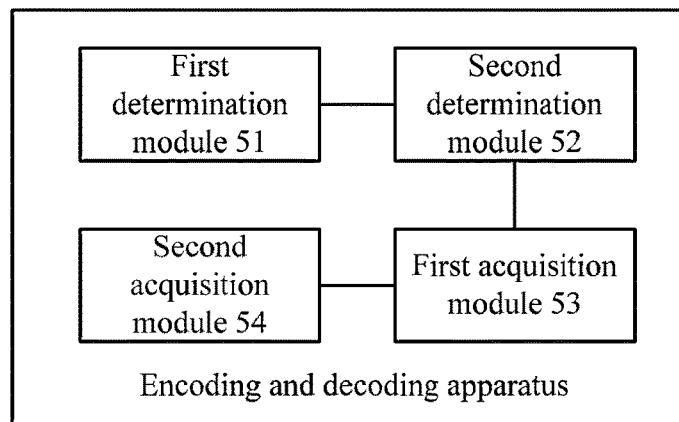
FIG. 5 is a structural diagram of an encoding and decoding device according to an embodiment of the present application.

Embodiment 29:

Based on the same concept as the above method in this application, an embodiment of the present application also proposes an encoding and decoding apparatus applied to an encoding side or a decoding side. The apparatus is configured to acquire a target prediction value of a current block or a sub-block of the current block if the characteristic information of the current block meets a specific condition. FIG. 5 shows a structural diagram of the apparatus, including:

a first determination module 51 configured for: if the characteristic information of the current block meets a specific condition, determining a first original prediction value based on first unidirectional motion information of the current block, and determining a second original prediction value based on second unidirectional motion information of the current block;

a second determination module 52 configured for determining a horizontal velocity based on the first original prediction value and the second original prediction value; determining a vertical velocity based on the first original prediction value and the second original prediction value;

a first acquisition module 53 configured for acquiring a prediction compensation value based on the horizontal velocity and the vertical velocity;

a second acquisition module 54 configured for acquiring a target prediction value based on the first original prediction value, the second original prediction value and the prediction compensation value.

Exemplarily, the characteristic information may include, but is not limited to, one or more of a motion information attribute, a prediction mode attribute, size information, and sequence-level switch control information.

The first determination module 51 is further configured for: if the characteristic information includes the motion information attribute that meets at least one of the following conditions, determining that the motion information attribute meets a specific condition:

bidirectional prediction is used for the current block, and the two reference frames corresponding to the current block come from different directions;

the current block includes multiple sub-blocks, and the motion information of the multiple sub-blocks is the same;

bidirectional prediction is used for the current block, and the weighing weights of the two reference frames corresponding to the current block are the same;

bidirectional prediction is used for the current block, and the two reference frames corresponding to the current block are at the same distance from a current slice;

bidirectional prediction is used for the current block, and the difference between the prediction values of the two reference frames corresponding to the current block is less than a preset threshold.

The first determination module 51 is further configured for: acquiring a first prediction block from a first reference frame based on the first unidirectional motion information of the current block, and acquiring a second prediction block from a second reference frame based on the second unidirectional motion information of the current block;

acquiring the difference between the prediction values of the first reference frame and the second reference frame based on the SAD of the down-sampled prediction value of the first prediction block and a down-sampled prediction value of the second prediction block.

The first determination module 51 is further configured for: if the characteristic information includes the prediction mode attribute indicating that a Merge mode based on combined inter and intra prediction is not used and/or a symmetrical motion vector difference mode is not used, determining that the prediction mode attribute meets a specific condition.

The first determination module 51 is further configured for: if the characteristic information includes the sequence-level switch control information indicating that it is allowed to use a bidirectional optical flow mode for the current block, determining that the sequence-level switch control information meets a specific condition.

The first determination module 51 is further configured for: if the characteristic information includes the size information that meets at least one of the following conditions, determining that the size information meets a specific condition: the width value of the current block is greater than or equal to a first threshold, and is less than or equal to a second threshold; the height value of the current block is greater than or equal to a third threshold, and is less than or equal to a fourth threshold; the area value of the current block is greater than or equal to a fifth threshold, and is less than or equal to a sixth threshold.

When the first determination module 51 determines a first original prediction value based on the first unidirectional motion information of the current block, and determines a second original prediction value based on the second unidirectional motion information of the current block, the first determination module is configured specifically for: determining a first reference block from the first reference frame based on the first unidirectional motion information of the current block, and determining the first original prediction value of the first reference block; wherein, the first original prediction value of the central area of the first reference block is obtained by interpolating a pixel value of a pixel in the first reference frame, and the first original prediction value of the edge area of the first reference block is obtained by copying a pixel value of a pixel in the first reference frame; determining a second reference block from the second reference frame based on the second unidirectional motion information of the current block, and determining a second original prediction value of the second reference block; wherein, the second original prediction value of the central area of the second reference block is obtained by interpolating the pixel value of a pixel in the second reference frame. The second original prediction value of the edge area of the second reference block is obtained by copying the pixel value of a pixel in the second reference frame.

When the second determination module 52 determines a horizontal velocity based on the first original prediction value and the second original prediction value, it is configured specifically for: if a first preset condition is met, determining a cross-correlation coefficient S2 between the horizontal gradient sum and the vertical gradient sum, a cross-correlation coefficient S6 between the difference of the time domain prediction values and the vertical gradient sum based on the first original prediction value and the second original prediction value; determining the horizontal velocity based on the cross-correlation coefficient S2, the velocity threshold, the cross-correlation coefficient S6, a first amplification factor and a second amplification factor; wherein the first preset condition is determined based on the cross-correlation coefficient S2, an autocorrelation coefficient S5 of the vertical gradient sum.

When the second determination module 52 determines a horizontal velocity based on the first original prediction value and the second original prediction value, it is configured specifically for: if a second preset condition is met, determining an autocorrelation coefficient S1 of the horizontal gradient sum, a cross-correlation coefficient S2 between the horizontal gradient sum and the vertical gradient sum, a cross-correlation coefficient S3 between the difference of the time domain prediction values and the horizontal gradient sum, an autocorrelation coefficient S5 of the vertical gradient sum, a cross-correlation coefficient S6 between the difference of the time domain prediction values and the vertical gradient sum based on the first original prediction value and the second original prediction value; determining the horizontal velocity based on the autocorrelation coefficient S1, the cross-correlation coefficient S2, the cross-correlation coefficient S3, the autocorrelation coefficient S5, the cross-correlation coefficient S6, the velocity threshold, the first amplification factor and the second amplification factor, wherein the second preset condition is determined based on the cross-correlation coefficient S2, and the autocorrelation coefficient S5.

When the second determination module 52 determines a vertical velocity based on the first original prediction value and the second original prediction value, it is configured specifically for: acquiring an untruncated horizontal velocity without truncation processing based on the first original prediction value and the second original prediction value, and determining the vertical velocity based on the untruncated horizontal velocity.

When the second determination module 52 determines a vertical velocity based on the first original prediction value and the second original prediction value, it is configured specifically for: if the third preset condition is met, determining an autocorrelation coefficient S5 of the vertical gradient sum, a cross-correlation coefficient S6 between the difference of the time domain prediction values and the vertical gradient sum based on the first original prediction value and the second original prediction value; determining the vertical velocity based on the autocorrelation coefficient S5, the cross-correlation coefficient S6, the velocity threshold, the first amplification factor and the second amplification factor; wherein, the third preset condition is determined based on the horizontal velocity.

The cross-correlation coefficient S2 is located between a first cross-correlation coefficient threshold and a second cross-correlation coefficient threshold.

The cross-correlation coefficient S6 is located between a third cross-correlation coefficient threshold and a fourth cross-correlation coefficient threshold.

The first amplification factor is the smaller of 5 and (BD−7), or the larger of 1 and (BD−11); the second amplification factor is the smaller of 8 and (BD−4), or the larger of 4 and (BD−8); The velocity threshold is M powers of 2, and M is the difference between 13 and BD, or the larger of 5 and (BD−7); wherein, BD is the bit depth.

When the first acquisition module 53 acquires a prediction compensation value based on the horizontal velocity and the vertical velocity, it is configured for: determining a horizontal gradient and a vertical gradient based on the first original prediction value, the second original prediction value and a gradient right-shift bit number, and acquiring a prediction compensation value based on the horizontal velocity, the vertical velocity, the horizontal gradient and the vertical gradient; wherein, the gradient right-shift bit number is the larger of 2 and (14−BD), or the larger of 6 and (BD−6), and BD is the bit depth.

Figure 6:
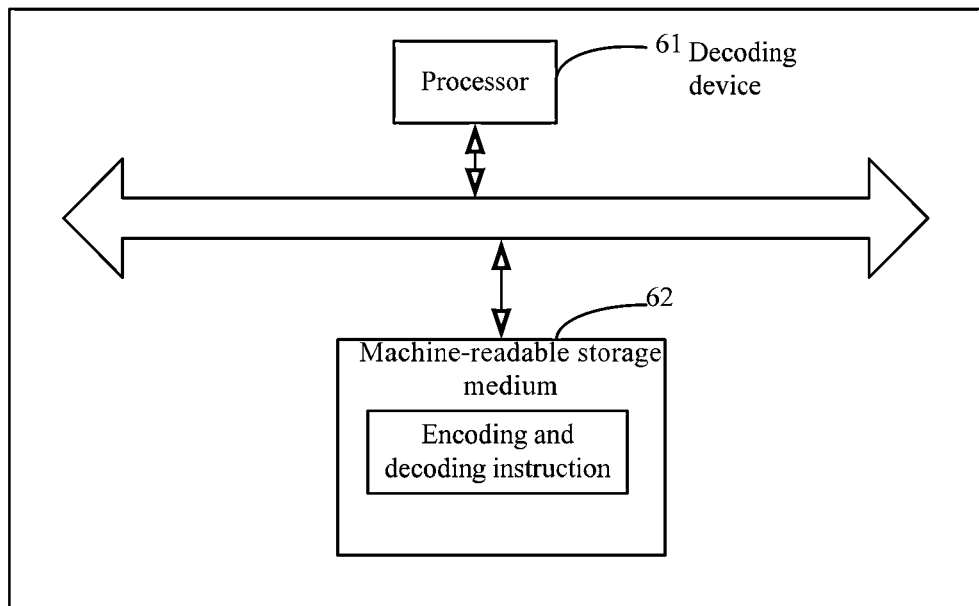
FIG. 6 is a hardware structure diagram of a decoding device according to an embodiment of the present application.

For the decoding device provided by an embodiment of the present application, from an aspect of hardware, the schematic diagram of the hardware architecture of the device may be specifically shown in FIG. 6. The decoding device includes a processor 61 and a machine-readable storage medium 62, wherein the machine-readable storage medium 62 stores machine executable instructions that can be executed by the processor 61. The processor 61 is configured to execute machine executable instructions to implement the method disclosed in the above examples of the present application. For example, the processor is configured to execute machine executable instructions to implement the following steps:

if characteristic information of a current block meets a specific condition, performing the following steps to acquire a target prediction value of the current block or a sub-block of the current block: determining a first original prediction value based on first unidirectional motion information of the current block, and determining a second original prediction value based on second unidirectional motion information of the current block; determining a horizontal velocity based on the first original prediction value and the second original prediction value; determining a vertical velocity based on the first original prediction value and the second original prediction value; acquiring a prediction compensation value based on the horizontal velocity and the vertical velocity; acquiring a target prediction value based on the first original prediction value, the second original prediction value and the prediction compensation value.

Figure 7:
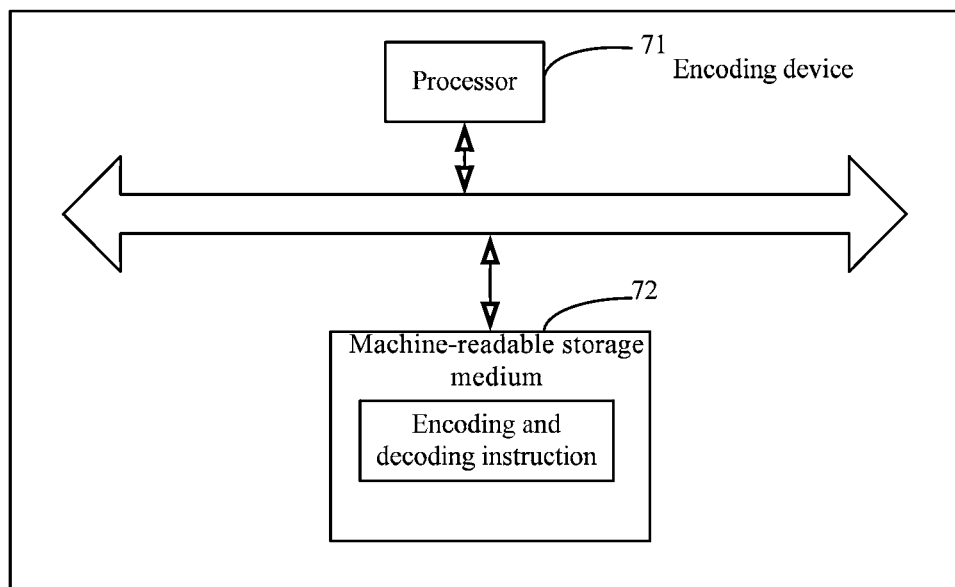
FIG. 7 is a hardware structure diagram of an encoding device according to an embodiment of the present application.

For the encoding device provided by an embodiment of the present application, from an aspect of hardware, the schematic diagram of the hardware architecture of the device may be specifically shown in FIG. 7. The decoding device includes a processor 71 and a machine-readable storage medium 72, wherein the machine-readable storage medium 72 stores machine executable instructions that can be executed by the processor 71. The processor 71 is configured to execute machine executable instructions to implement the method disclosed in the above examples of the present application. For example, the processor is configured to execute machine executable instructions to implement the following steps:

if characteristic information of a current block meets a specific condition, performing the following steps to acquire a target prediction value of a current block or a sub-block of the current block: determining a first original prediction value based on first unidirectional motion information of the current block, and determining a second original prediction value based on second unidirectional motion information of the current block; determining a horizontal velocity based on the first original prediction value and the second original prediction value; determining a vertical velocity based on the first original prediction value and the second original prediction value; acquiring a prediction compensation value based on the horizontal velocity and the vertical velocity; acquiring a target prediction value based on the first original prediction value, the second original prediction value and the prediction compensation value.

Based on the same concept as the above method in this application, an embodiment of the present application further provides a machine-readable storage medium, wherein the machine-readable storage medium stores a plurality of computer instructions which, when executed by a processor, can cause the processor to implement the encoding and decoding methods disclosed in the above examples of the present application. The machine-readable storage medium may be any electronic, magnetic, optical, or other physical storage apparatus that can contain or store information such as executable instructions, data, and the like. For example, the machine-readable storage medium can be an RAM (Random Access Memory), a volatile memory, a non-volatile memory, a flash memory, a storage drive (e.g., a hard drive), a solid state drive, any type of storage disk (e.g., a compact disk, a DVD, etc.), or similar storage medium, or a combination thereof.

The systems, apparatuses, modules or units described in the above embodiments can be implemented by a computer chip or an entity, or implemented by a product with certain functions. It is typically implemented as a computer, which can be in the form of a personal computer, a laptop, a cellular telephone, a camera phone, a smart phone, a personal digital assistant, a media player, a navigation device, an email messaging device, a tablet computer, a wearable device, or a combination of any of these devices.

For ease of description, the above apparatuses are separately described in various units based on their functions. Of course, when implementing this application, the functions of each unit can be realized in one or more software and/or hardware.

Those skilled in the art will appreciate that the embodiments of the present application may be disclosed by the methods, systems, or computer program products. The present application may take the form of an entirely hardware embodiment, an entirely software embodiment or an embodiment combining software and hardware aspects. Furthermore, embodiments of the present application may take the form of a computer program product embodied on one or more computer-usable storage media (including, but not limited to, disk storage, CD-ROM, optical storage, and the like) having computer-usable program code embodied therein.

The present application is described with reference to flowchart illustrations and/or block diagrams of methods, devices (systems), and computer program products according to embodiments of the application. It will be understood that each flow and/or block of the flowchart illustrations and/or block diagrams, and combinations of flows and/or blocks of the flowchart illustrations and/or block diagrams, can be implemented by computer program instructions. These computer program instructions can be provided to a processor of a general purpose computer, special purpose computer, embedded processor, or other programmable data processing device to produce a machine, such that the instructions, which execute via the processor of the computer or other programmable data processing device, produce apparatus for implementing the functions specified in the flowchart flow or flows and/or block diagram block or blocks. Furthermore, these computer program instructions can also be stored in a computer-readable memory that can direct a computer or other programmable data processing apparatus to function in a particular manner, such that the instructions stored in the computer-readable memory produce an article of manufacture including instruction apparatus which implement the function specified in the flowchart flow or flows and/or block diagram block or blocks.

These computer program instructions can also be loaded onto a computer or other programmable data processing apparatus to cause a series of operational steps to be performed on the computer or other programmable device to produce a computer implemented process such that the instructions which execute on the computer or other programmable apparatus relates to steps for implementing the functions specified in one or more flows in the flowchart and/or one or more blocks in the block diagram. The above description is only an embodiment of the present application and is not intended to limit the present application. Various modifications and changes may occur to those skilled in the art to which the present application pertains. Any modification, equivalent replacement, improvement or the like made within the spirit and principle of the present application shall be included in the scope of the claims of the present application.

What is claimed is:

1. A decoding method, comprising:
when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a combined inter-picture merge and intra-picture prediction mode is not used for the current block, and a symmetric motion vector difference mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;
wherein, the current block comprises one or more sub-blocks, performing motion compensation based on the bidirectional optical flow mode on the current block comprises:
for each sub-block of the one or more sub-blocks included in the current block, determining a target prediction value of the sub-block; and determining a prediction value of the current block based on target prediction values of all sub-blocks included in the current block;
wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

2. The method of claim 1, wherein, determining a target prediction value of the sub-block comprises:
determining a first original prediction value and a second original prediction value of the sub-block; determining a target prediction value of each 4×4 block in the sub-block based on the first original prediction value and the second original prediction value of the sub-block; determining the target prediction value of the sub-block based on the target prediction value of each 4×4 block in the sub-block.

3. The method of claim 2, wherein, determining the target prediction value of the 4×4 block based on the first original prediction value and the second original prediction value of the sub-block comprises:
for each 4×4 block in the sub-block, determining a horizontal velocity of the 4×4 block based on the first original prediction value and the second original prediction value; determining a vertical velocity of the 4×4 block based on the first original prediction value and the second original prediction value; acquiring a prediction compensation value of the 4×4 block based on the horizontal velocity and the vertical velocity of the 4×4 block; acquiring the target prediction value of the 4×4 block based on the first original prediction value, the second original prediction value and the prediction compensation value of the 4×4 block.

4. The method of claim 1, wherein, motion information of the current block comprises a first motion vector and a first reference frame index, a second motion vector and a second reference frame index; determining the first original prediction value and the second original prediction value of the sub-block comprises: determining the first original prediction value of the sub-block based on the first motion vector and the first reference frame index, determining the second original prediction value of the sub-block based on the second motion vector and the second reference frame index.

5. The method of claim 4, wherein, determining the first original prediction value of the sub-block based on the first motion vector and the first reference frame index, determining the second original prediction value of the sub-block based on the second motion vector and the second reference frame index, comprises: determining a first reference block from a first reference frame corresponding to the first reference frame index based on the first motion vector, and determining the first original prediction value based on a prediction value of the first reference block; determining a second reference block from a second reference frame corresponding to the second reference frame index based on the second motion vector, and determining the second original prediction value based on a prediction value of the second reference block;

wherein, the prediction value of the first reference block comprises a prediction value of a central area of the first reference block and a prediction value of an edge area of the first reference block, the prediction value of the central area of the first reference block is obtained by performing interpolation on a pixel value of a pixel in the first reference frame, and the prediction value of the edge area of the first reference block is obtained by copying a pixel value of a pixel in the first reference frame; the prediction value of the second reference block comprises a prediction value of a central area of the second reference block and a prediction value of an edge area of the second reference block, the prediction value of the central area of the second reference block is obtained by performing interpolation on a pixel value of a pixel in the second reference frame, and the prediction value of the edge area of the second reference block is obtained by copying a pixel value of a pixel in the second reference frame.

6. The method of claim 5, wherein, the edge area of the first reference block is an area with 1 row and 1 column at upper, lower, left, and right portions respectively, except the central area, the prediction value of the edge area of the first reference block is obtained by copying an integer pixel value of a pixel adjacent to the edge area of the first reference block in the first reference frame; the edge area of the second reference block is an area with 1 row and 1 column at upper, lower, left, and right portions respectively, except the central area, the prediction value of the edge area of the second reference block is obtained by copying an integer pixel value of a pixel adjacent to the edge area of the second reference block in the second reference frame.

7. The method of claim 1, wherein, when the current block comprises 1 sub-block, the sub-block is the current block itself; when the current block comprises multiple sub-blocks, motion information of the multiple sub-blocks is the same as that of the current block.

8. The method of claim 3, wherein,
determining a horizontal velocity of the 4×4 block based on the first original prediction value and the second original prediction value comprises:
determining a first prediction value and a second prediction value of the 4×4 block based on the first original prediction value and the second original prediction value, determining the horizontal velocity of the 4×4 block based on the first prediction value and the second prediction value of the 4×4 block;
determining a vertical velocity of the 4×4 block based on the first original prediction value and the second original prediction value comprises: determining the vertical velocity of the 4×4 block based on the first prediction value and the second prediction value of the 4×4 block;
acquiring the target prediction value of the 4×4 block based on the first original prediction value, the second original prediction value and the prediction compensation value of the 4×4 block comprises: acquiring the target prediction value of the 4×4 block based on the first prediction value of the 4×4 block, the second prediction value of the 4×4 block, and the prediction compensation value of the 4×4 block.

9. The method of claim 8, wherein, determining a first prediction value and a second prediction value of the 4×4 block based on the first original prediction value and the second original prediction value comprises:
determining a 6×6 block corresponding to the 4×4 block in the first reference block, acquiring a prediction value of the 6×6 block based on the first original prediction value of the first reference block, and determining the prediction value of the 6×6 block as the first prediction value of the 4×4 block;
determining a 6×6 block corresponding to the 4×4 block in the second reference block, acquiring a prediction value of the 6×6 block based on the second original prediction value of the second reference block, and determining the prediction value of the 6×6 block as the second prediction value of the 4×4 block.

10. The method of claim 3, wherein, determining a horizontal velocity and a vertical velocity of the 4×4 block based on the first original prediction value and the second original prediction value comprises:
determining an autocorrelation coefficient S1 of a horizontal gradient sum of the 4×4 block, a cross-correlation coefficient S2 between the horizontal gradient sum and a vertical gradient sum of the 4×4 block, a cross-correlation coefficient S3 between a difference of time domain prediction values and the horizontal gradient sum of the 4×4 block, an autocorrelation coefficient S5 of the vertical gradient sum of the 4×4 block, a cross-correlation coefficient S6 between the difference of time domain prediction values and the vertical gradient sum of the 4×4 block based on the first original prediction value and the second original prediction value;
determining the horizontal velocity and the vertical velocity of the 4×4 block based on the S1, S2, S3, S5, and S6;
wherein, determining the S1, S2, S3, S5, and S6 of the 4×4 block based on the first original prediction value and the second original prediction value comprises:
determining the horizontal gradient sum of the 4×4 block, the vertical gradient sum of the 4×4 block, the difference of time domain prediction values of the 4×4 block based on the first original prediction value and the second original prediction value;
determining the S1, S2, S3, S5, and S6 of the 4×4 block based on the horizontal gradient sum, the vertical gradient sum, the difference of time domain prediction values.

11. The method of claim 3, wherein, determining a horizontal velocity of the 4×4 block based on the first original prediction value and the second original prediction value comprises:

determining an autocorrelation coefficient S1 of a horizontal gradient sum of the 4×4 block, a cross-correlation coefficient S3 between a difference of time domain prediction values and the horizontal gradient sum of the 4×4 block based on the first original prediction value and the second original prediction value;

determining the horizontal velocity of the 4×4 block based on the S1, a velocity threshold, the S3; wherein the velocity threshold is M powers of 2, and M is a positive integer;

determining a vertical velocity of the 4×4 block based on the first original prediction value and the second original prediction value comprises:

determining a cross-correlation coefficient S2 between the horizontal gradient sum and a vertical gradient sum of the 4×4 block, an autocorrelation coefficient S5 of the vertical gradient sum of the 4×4 block, a cross-correlation coefficient S6 between the difference of time domain prediction values and the vertical gradient sum of the 4×4 block based on the first original prediction value and the second original prediction value; determining the vertical velocity of the 4×4 block based on the S2, the S5, the S6, a velocity threshold, and the horizontal velocity of the 4×4 block; wherein the velocity threshold is M powers of 2, and M is a positive integer;

wherein, acquiring a prediction compensation value of the 4×4 block based on the horizontal velocity and the vertical velocity of the 4×4 block comprises:

determining a horizontal gradient of the 4×4 block and a vertical gradient of the 4×4 block based on the first original prediction value, the second original prediction value, and the number of right shifts of the gradient; and acquiring the prediction compensation value of the 4×4 block based on the horizontal velocity of the 4×4 block, the vertical velocity of the 4×4 block, the horizontal gradient of the 4×4 block, and the vertical gradient of the 4×4 block.

12. The method of claim 1, further comprising:

for each sub-block of the one or more sub-blocks included in the current block, determining whether a current sub-block meets a specific condition, if the current sub-block meets the specific condition, jumping out of a process of performing prediction compensation on the sub-block based on bidirectional optical flow, wherein, the process of performing prediction compensation on the sub-block based on bidirectional optical flow comprises: for the sub-block, determining the first original prediction value and the second original prediction value of the sub-block; determining a target prediction value of each 4×4 block in the sub-block based on the first original prediction value and the second original prediction value of the sub-block, determining the target prediction value of the sub-block based on the target prediction value of each 4×4 block in the sub-block.

13. The method of claim 12, wherein, determining whether to jump out of the process of performing prediction compensation on the sub-block based on the bidirectional optical flow according to a relationship between a SAD value of the sub-block and a sub-block threshold; wherein, the SAD value of the sub-block is a sum of absolute difference of a vertical two-times down-sampled prediction value of the first prediction block and a vertical two-times down-sampled prediction value of the second prediction block; wherein, the first prediction block is a prediction block corresponding to a sub-block acquired from the first reference frame according to a first motion vector of the current block, and the second prediction block is a prediction block corresponding to a sub-block acquired from the second reference frame according to a second motion vector of the current block.

14. The method of claim 1, wherein, for conditions that bidirectional prediction is used for the current block, two reference frames corresponding to the current block come from different directions, and the two reference frames corresponding to the current block are at a same distance from a current slice, if a display sequence number of the current slice is POC, and the display sequence numbers of the two reference frames corresponding to the current block are POC0 and POC1 respectively, when (POC−POC0)*(POC−POC1)<0, it is considered that the two reference frames come from different directions, and when a value of (POC−POC0) equal to a value of (POC1−POC), it is considered that the distances between the two reference frames and the current slice are the same;

wherein, the weighting weights of the two reference frames corresponding to the current block being the same comprises that it is allowed to use a frame-level weighted prediction method for the current slice and two weighting weights of the current slice are exactly the same; and that it is allowed to use a block-level weighted prediction method Bi-prediction with CU based weighting for the current block and the two weighting weights of the current block are exactly the same;

wherein, the sub-block motion information mode being not used for the current block comprises that an Affine mode is not used for the current block and an subblock-based temporal motion vector prediction mode is not used for the current block; wherein the Affine mode is a mode using an affine motion model, and the subblock-based temporal motion vector prediction mode is a mode for acquiring motion information of an entire block in time domain;

wherein, the width value, the height value, and the area value of the current block being all within a limited range, comprises that the width value of the current block is greater than or equal to 8, the height value of the current block is greater than or equal to 8, and a product of the width value and the height value of the current block is greater than or equal to 128.

15. A decoding apparatus, which is configured to implement operations of:

when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a combined inter-picture merge and intra-picture prediction mode is not used for the current block, and a symmetric motion vector difference mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;

wherein, the current block comprises one or more sub-blocks, performing motion compensation based on the bidirectional optical flow mode on the current block comprises:

for each sub-block of the one or more sub-blocks included in the current block, determining a target prediction value of the sub-block; and determining a prediction value of the current block based on target prediction values of all sub-blocks included in the current block;

wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

16. A video decoding device, comprising:

a processor and a machine-readable storage medium, wherein the machine-readable storage medium stores thereon machine executable instructions that can be executed by the processor;

the processor is configured to execute the machine executable instructions to implement operations of:

when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a combined inter-picture merge and intra-picture prediction mode is not used for the current block, and a symmetric motion vector difference mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;

wherein, the current block comprises one or more sub-blocks, performing motion compensation based on the bidirectional optical flow mode on the current block comprises:

for each sub-block of the one or more sub-blocks included in the current block, determining a target prediction value of the sub-block; and determining a prediction value of the current block based on target prediction values of all sub-blocks included in the current block;

wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

17. An electronic device, comprising:

a processor; and a memory for storing processor executable instructions;

wherein, the processor is configured to implement operations of:

when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a combined inter-picture merge and intra-picture prediction mode is not used for the current block, and a symmetric motion vector difference mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;

wherein, the current block comprises one or more sub-blocks, performing motion compensation based on the bidirectional optical flow mode on the current block comprises:

for each sub-block of the one or more sub-blocks included in the current block, determining a target prediction value of the sub-block; and determining a prediction value of the current block based on target prediction values of all sub-blocks included in the current block;

wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

18. A non-transitory storage medium, wherein the non-transitory storage medium stores thereon instructions which, when executed by a processor, cause the processor to implement operations of:
when it is determined to use a bidirectional optical flow mode for a current block, performing motion compensation based on the bidirectional optical flow mode on the current block, wherein when the bidirectional optical flow mode is used for the current block, conditions which the current block meets at the same time at least comprise: switch control information indicates that it is allowed to use the bidirectional optical flow mode for the current block; a sub-block motion information mode is not used for the current block, a combined inter-picture merge and intra-picture prediction mode is not used for the current block, and a symmetric motion vector difference mode is not used for the current block; bidirectional prediction is used for the current block, and two reference frames corresponding to the current block come from different directions, and the two reference frames corresponding to the current block are at a same distance from a current slice; bidirectional prediction is used for the current block, and weighting weights of the two reference frames corresponding to the current block are the same; a width value, a height value, and an area value of the current block are all within a limited range;
wherein, the current block comprises one or more sub-blocks, performing motion compensation based on the bidirectional optical flow mode on the current block comprises:
for each sub-block of the one or more sub-blocks included in the current block, determining a target prediction value of the sub-block; and determining a prediction value of the current block based on target prediction values of all sub-blocks included in the current block;
wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

19. A decoding method, comprising:
when it is determined to use a bidirectional optical flow mode for a current block, performing motion compensation based on the bidirectional optical flow mode on the current block, wherein when the bidirectional optical flow mode is used for the current block, conditions which the current block meets at least comprise: a combined inter-picture merge and intra-picture prediction mode is forbidden to be used for the current block, and a symmetric motion vector difference mode is forbidden to be used for the current block;
wherein, the current block comprises one or more sub-blocks, performing motion compensation based on the bidirectional optical flow mode on the current block comprises:
for each sub-block of the one or more sub-blocks included in the current block, determining a target prediction value of the sub-block; and determining a prediction value of the current block based on target prediction values of all sub-blocks included in the current block;
wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

20. A decoding method, comprising:
when it is determined to use a bidirectional optical flow mode for a current block, performing motion compensation based on the bidirectional optical flow mode on the current block, wherein when the bidirectional optical flow mode is used for the current block, conditions which the current block meets at least comprise: a width value of the current block is greater than or equal to 8, a height value of the current block is greater than or equal to 8, and a product of the width value and the height value of the current block is greater than or equal to 128;
wherein, the current block comprises one or more sub-blocks, performing motion compensation based on the bidirectional optical flow mode on the current block comprises:
for each sub-block of the one or more sub-blocks included in the current block, determining a target prediction value of the sub-block; and determining a prediction value of the current block based on target prediction values of all sub-blocks included in the current block;
wherein, determining a target prediction value of the sub-block comprises: determining a first original prediction value and a second original prediction value of the sub-block; determining a horizontal velocity of the sub-block based on the first original prediction value and the second original prediction value; determining a vertical velocity of the sub-block based on the first original prediction value and the second original prediction value; acquiring a prediction compensation value of the sub-block based on the horizontal velocity and the vertical velocity; acquiring the target prediction value of the sub-block based on the first original prediction value, the second original prediction value and the prediction compensation value.

* * * * *